(12) United States Patent
Nakamura

(10) Patent No.: US 10,400,690 B2
(45) Date of Patent: Sep. 3, 2019

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Toshihiro Nakamura, Shizuoka-ken (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 70 days.

(21) Appl. No.: 15/869,667

(22) Filed: Jan. 12, 2018

(65) Prior Publication Data
US 2018/0202377 A1 Jul. 19, 2018

(30) Foreign Application Priority Data
Jan. 19, 2017 (JP) ................................ 2017-007877

(51) Int. Cl.
| | | |
|---|---|---|
| F02D 41/30 | (2006.01) | |
| F02D 41/00 | (2006.01) | |
| F02D 41/40 | (2006.01) | |
| F02D 13/02 | (2006.01) | |
| F02B 1/14 | (2006.01) | |

(Continued)

(52) U.S. Cl.
CPC ............ *F02D 41/0057* (2013.01); *F02B 1/14* (2013.01); *F02B 3/08* (2013.01); *F02B 47/08* (2013.01); *F02D 13/0215* (2013.01); *F02D 41/006* (2013.01); *F02D 41/0065* (2013.01); *F02D 41/0072* (2013.01); *F02D 41/307* (2013.01); *F02D 41/3035* (2013.01); *F02D 41/3047* (2013.01); *F02D 41/3064* (2013.01); *F02D 41/402* (2013.01); *F02D 41/405* (2013.01); *F02D 2041/0022* (2013.01); *F02D 2200/025* (2013.01); *F02D 2250/32* (2013.01)

(58) Field of Classification Search
CPC ............... F02D 41/0057; F02D 41/402; F02D 41/3047; F02D 41/006; F02D 41/307; F02D 41/0065; F02D 41/405; F02D 41/3064; F02D 41/0072; F02D 41/3035; F02D 41/1454; F02D 41/1455; F02D 41/1456; F02D 41/0002; F02D 13/0215; F02D 2200/025; F02D 2250/32; F02D 2041/0022; F02B 3/08; F02B 47/08; F02B 1/14
USPC ........................ 123/299, 300, 399, 672, 436; 701/103–105, 109, 110
See application file for complete search history.

(56) References Cited

U.S. PATENT DOCUMENTS

| | | |
|---|---|---|
| 6,067,954 A | 5/2000 | Kudou et al. |
| 2003/0196635 A1 | 10/2003 | Kataoka et al. |

(Continued)

FOREIGN PATENT DOCUMENTS

| | | |
|---|---|---|
| DE | 102011105907 A1 | 1/2012 |
| EP | 1496234 A2 | 1/2005 |
| EP | 1803918 A1 | 7/2007 |

(Continued)

*Primary Examiner* — Hai H Huynh
(74) *Attorney, Agent, or Firm* — Sughrue Mion, PLLC

(57) ABSTRACT

A control device for an internal combustion engine including a fuel injection valve and an actuator includes an electronic control unit. The fuel injection valve directly injects fuel into a combustion chamber. The actuator is configured to change the oxygen concentration in intake gas supplied to the combustion chamber of the internal combustion engine. The electronic control unit is configured to control fuel injection from the fuel injection valve and the actuator.

5 Claims, 15 Drawing Sheets

(51) Int. Cl.
   *F02B 3/08*      (2006.01)
   *F02B 47/08*     (2006.01)

(56) References Cited

U.S. PATENT DOCUMENTS

2011/0320108 A1   12/2011   Morinaga et al.
2012/0000197 A1    1/2012   Maruyama et al.

FOREIGN PATENT DOCUMENTS

| EP | 2975246 A1    | 1/2016  |
|----|---------------|---------|
| JP | 11-159382 A   | 6/1999  |
| JP | 2004-003415 A | 1/2004  |
| JP | 2015-117651 A | 6/2015  |
| WO | 2011122015 A1 | 10/2011 |

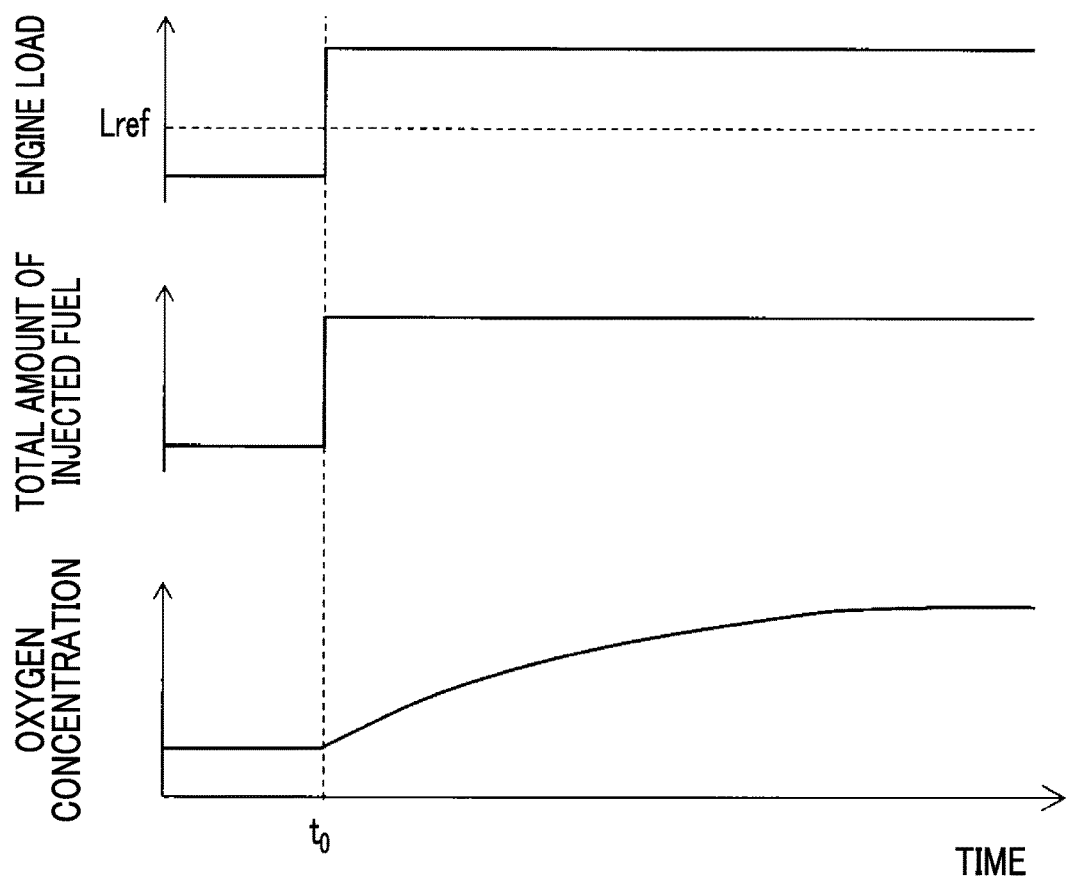

CONTROL DEVICE FOR INTERNAL COMBUSTION ENGINE

INCORPORATION BY REFERENCE

The disclosure of Japanese Patent Application No. 2017-007877 filed on Jan. 19, 2017 including the specification, drawings and abstract is incorporated herein by reference in its entirety.

BACKGROUND

1. Technical Field

The disclosure relates to a control device for an internal combustion engine.

2. Description of Related Art

An internal combustion engine that can switch the form of combustion between combustion based on premixed charge compression ignition (PCCI) and combustion based on diffusive combustion (DC) is known in the related art. The premixed charge compression ignition refers to a form of combustion in which an air-fuel premixture acquired by premixing fuel with air self-ignites. The diffusive combustion refers to a form of combustion in which air is supplied by diffusion from the ambient atmosphere.

Generally, when the combustion based on premixed charge compression ignition (hereinafter, simply referred to as "premixed-charge-based combustion") is performed, the oxygen concentration in intake gas supplied to a combustion chamber is decreased. Decreasing the oxygen concentration can reduce generation of NOx within the combustion chamber. When the combustion based on diffusive combustion (hereinafter, simply referred to as "diffusion-based combustion") is performed, the oxygen concentration in the intake gas supplied to the combustion chamber is increased. Increasing the oxygen concentration can reduce generation of soot within the combustion chamber.

When switching is performed between the premixed-charge-based combustion and the diffusion-based combustion, a deterioration in exhaust emission or an increase in combustion noise level may occur temporarily at the time of switching. The reason is that while the amount of injected fuel can be promptly changed in accordance with a change in engine load, the amount of air intake or the EGR rate cannot be promptly changed. Thus, the oxygen concentration cannot be promptly changed. Thus, a suggestion is made that when a deterioration in exhaust emission or an increase in combustion noise level needs to be reduced at the time of switching the form of combustion between the premixed-charge-based combustion and the diffusion-based combustion, fuel is post-injected during an expansion stroke or an exhaust stroke after an air-fuel mixture formed by main injection starts to combust (for example, Japanese Unexamined Patent Application Publication No. 2004-003415 (JP 2004-003415 A)).

SUMMARY

When the form of combustion is switched to the diffusion-based combustion from the premixed-charge-based combustion, a control device disclosed in JP 2004-003415 A increases the oxygen concentration by decreasing the EGR rate, and switches the form of fuel injection to a form of injection corresponding to the diffusion-based combustion from a form of injection corresponding to the premixed-charge-based combustion when the EGR rate becomes equal to a predetermined EGR rate. In addition, the control device performs post-injection after main injection before and after switching the form of injection.

When the form of combustion is switched to the premixed-charge-based combustion from the diffusion-based combustion, the control device disclosed in JP 2004-003415 A decreases the oxygen concentration by increasing the EGR rate, and switches the form of fuel injection to the form of injection corresponding to the premixed-charge-based combustion from the form of injection corresponding to the diffusion-based combustion when the EGR rate becomes equal to a predetermined EGR rate. In addition, the control device performs post-injection before and after switching the form of injection.

In the control performed by the control device disclosed in JP 2004-003415 A, for example, in switching of the form of combustion, fuel may be injected in the form of injection corresponding to the premixed-charge-based combustion in the state of a high engine load during transition in the switching. When fuel is injected in the form of injection corresponding to the premixed-charge-based combustion in the state of a high engine load, the combustion noise level may be increased.

The present disclosure provides a control device for an internal combustion engine. The control device reduces an increase in combustion noise level during transition in switching of the form of combustion between premixed-charge-based combustion and diffusion-based combustion.

An aspect of the present disclosure relates to a control device for an internal combustion engine. The internal combustion engine includes a fuel injection valve that directly injects fuel into a combustion chamber, and an actuator configured to change an oxygen concentration in intake gas supplied to the combustion chamber of the internal combustion engine. The control device includes an electronic control unit. The electronic control unit is configured to control fuel injection from the fuel injection valve and the actuator as follows. i) A first injection mode and a second injection mode are executed. The first injection mode is a mode in which main injection is performed after pre-injection is performed, and in which fuel injection from the fuel injection valve is controlled such that heat release from an air-fuel mixture formed by the pre-injection is started after the start of the main injection. The second injection mode is a mode in which main injection is performed after pre-injection is performed, and in which fuel injection from the fuel injection valve is controlled such that heat release from an air-fuel mixture formed by the pre-injection is started before the start of the main injection. ii) When fuel injection from the fuel injection valve is controlled in the first injection mode, the actuator is controlled such that the oxygen concentration is decreased by a larger amount than when fuel injection from the fuel injection valve is controlled in the second injection mode. iii) A first switching mode and a second switching mode are executed. The first switching mode is a mode in which pre-injection, main injection, and post-injection are performed in order, and in which fuel injection from the fuel injection valve is controlled such that heat release from an air-fuel mixture formed by the pre-injection is started after the start of the main injection, and that the post-injection is performed after heat release from an air-fuel mixture formed by the main injection is started. The second switching mode is a mode in which pre-injection, main injection, and post-injection are performed in order, and in which fuel injection from the fuel injection valve is controlled such that heat release from an air-fuel mixture formed by the pre-injection is started before the start of the main injection, and that the post-injection is performed after heat release from an air-fuel mixture formed by the main injection is started. iv) When an engine load is lower than a predetermined load, switching is performed through the first switching mode and the second switching mode. v) When the engine load is higher than or equal to the predetermined load, switching is performed through the second switching mode and not through the first switching mode.

In the control device according to the aspect of the present disclosure, the electronic control unit may be configured to perform switching through the second switching mode and not through the first switching mode when an injection mode is switched to the second injection mode from the first injection mode, and perform switching through the first switching mode and the second switching mode when the injection mode is switched to the first injection mode from the second injection mode.

In the control device according to the aspect of the present disclosure, the electronic control unit may be configured to perform the switching by performing a switching mode in an order of the second switching mode and the first switching mode, when the second injection mode is switched to the first injection mode.

In the control device according to the aspect of the present disclosure, when fuel is injected in the first switching mode, the electronic control unit may be configured to decrease a fuel injection amount of the main injection further than the fuel injection amount of the main injection in the first injection mode such that a combustion noise level becomes lower than or equal to a target combustion noise level, and when the amount of decrease becomes greater than or equal to a predetermined amount, maintain the amount of decrease at the predetermined amount and decrease an injection pressure of the main injection further than the injection pressure of the main injection in the first injection mode.

In the control device according to the aspect of the present disclosure, the electronic control unit may be configured to switch an injection mode to the first injection mode when the engine load becomes lower than the predetermined load, and switch the injection mode to the second injection mode when the engine load becomes higher than or equal to the predetermined load, and the predetermined load is changed in accordance with an engine rotational speed.

According to the aspect of the present disclosure, a control device for an internal combustion engine is provided. The control device reduces an increase in combustion noise level during transition in switching of the form of combustion between premixed-charge-based combustion and diffusion-based combustion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 6 is a timing chart of an engine load, the total amount of fuel injected from a fuel injection valve, and the oxygen concentration in intake gas supplied to the combustion chamber;

DETAILED DESCRIPTION OF EMBODIMENTS

Hereinafter, an embodiment of the present disclosure will be described in detail with reference to the drawings. In the following description, corresponding constituent elements will be designated with the same reference signs.

Overall Description of Internal Combustion Engine

Figure 1:
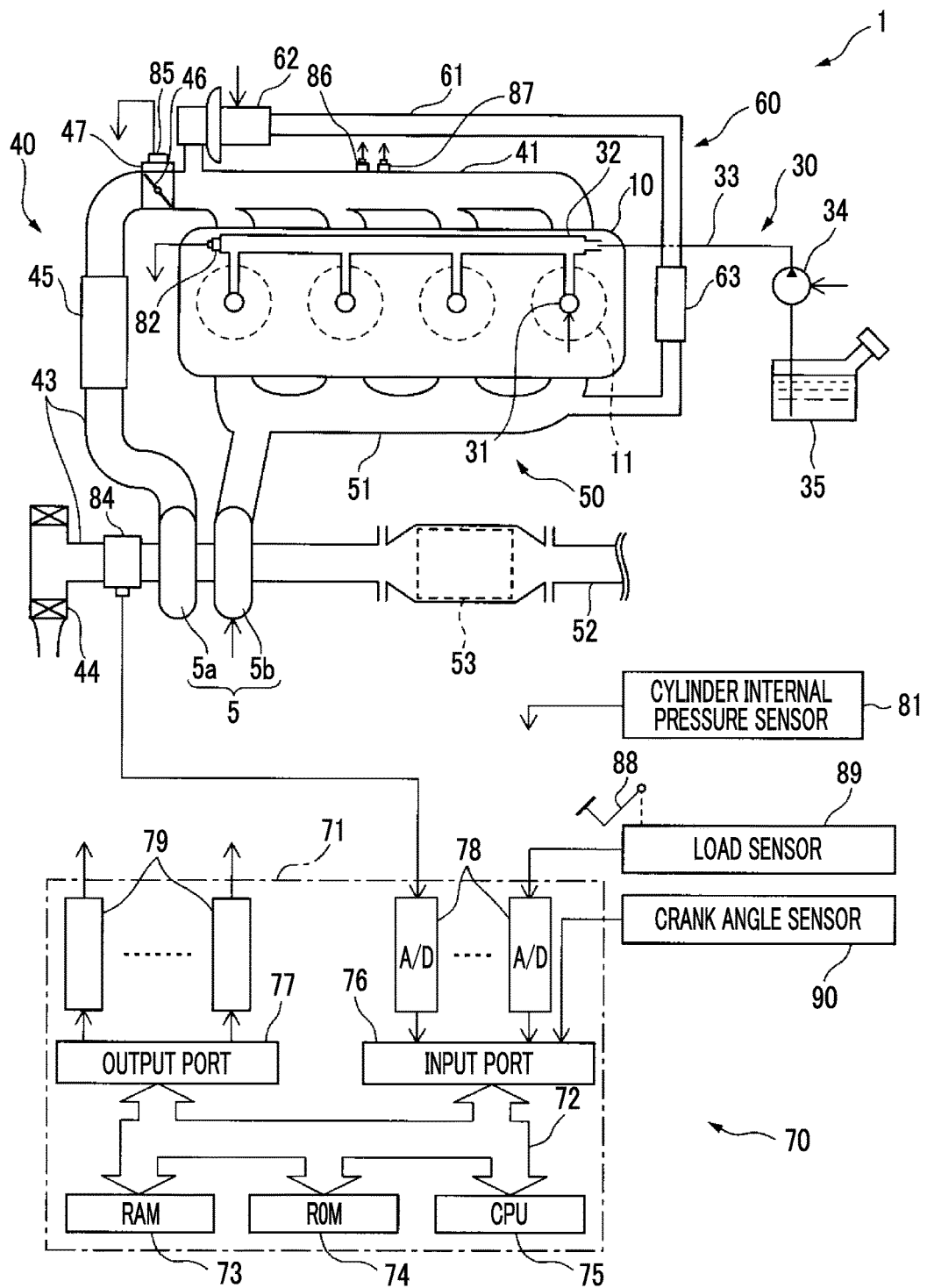
FIG. 1 is a schematic configuration diagram of an internal combustion engine.
Figure 2:
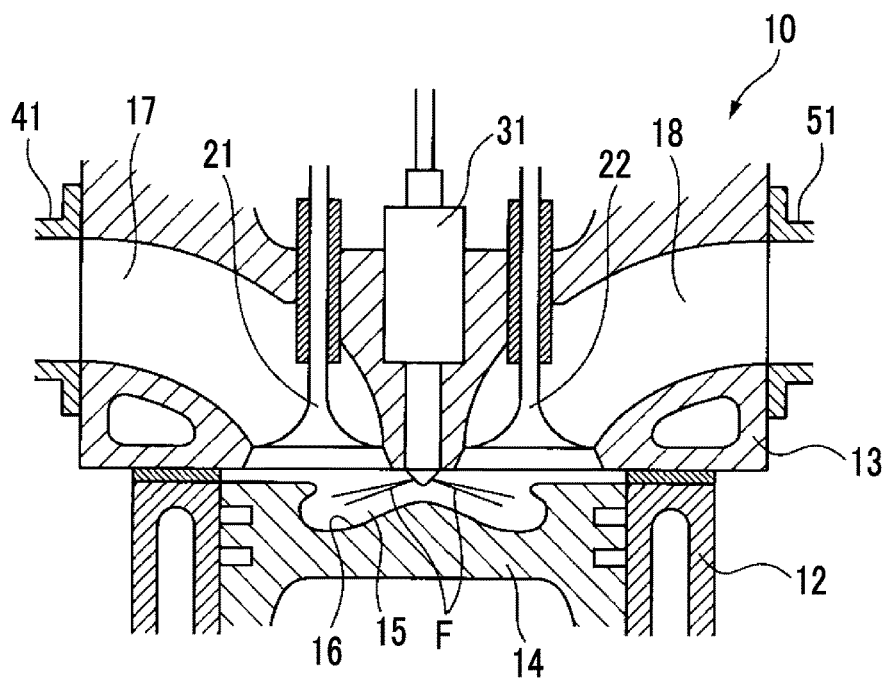
FIG. 2 is a schematic sectional view of an engine main body of the internal combustion engine.

First, a configuration of an internal combustion engine 1 for which a control device according to the present embodiment is used will be described with reference to FIG. 1 and FIG. 2. FIG. 1 is a schematic configuration diagram of the internal combustion engine 1. FIG. 2 is a schematic sectional view of an engine main body 10 of the internal combustion engine 1. The internal combustion engine of the present embodiment uses diesel as fuel.

As illustrated in FIG. 1 and FIG. 2, the internal combustion engine 1 includes the engine main body 10, a fuel supply device 30, an intake system 40, an exhaust system 50, an EGR mechanism 60, and a control device 70.

The engine main body 10 includes a cylinder block 12 and a cylinder head 13. A plurality of cylinders 11 is formed in the cylinder block 12. A piston 14 that reciprocates within each cylinder 11 is disposed within each cylinder 11. A combustion chamber 15 in which an air-fuel mixture combusts is formed within each cylinder 11 between the piston 14 and the cylinder head 13. A cavity 16 that is formed in a recessed shape is formed on the top surface of the piston 14.

As illustrated in FIG. 2, an intake port 17 and an exhaust port 18 are formed in the cylinder head 13. The intake port 17 and the exhaust port 18 communicate with the combustion chamber 15 of each cylinder 11. An intake valve 21 is disposed between the combustion chamber 15 and the intake port 17. The intake valve 21 opens or closes the intake port 17. An exhaust valve 22 is disposed between the combustion chamber 15 and the exhaust port 18. The exhaust valve 22 opens or closes the exhaust port 18.

As illustrated in FIG. 1, the fuel supply device 30 includes a fuel injection valve 31, a common rail 32, a fuel supply pipe 33, a fuel pump 34, and a fuel tank 35. The fuel injection valve 31 is disposed in the cylinder head 13 to directly inject fuel into the combustion chamber 15 of each cylinder 11. Particularly, in the present embodiment, each fuel injection valve 31 is disposed at the center on the upper wall surface of each combustion chamber 15. The fuel injection valve 31 is configured to inject fuel F toward proximity within the cavity 16 formed in the piston 14 (FIG. 2).

The fuel injection valve 31 is connected to the fuel tank 35 through the common rail 32 and the fuel supply pipe 33. The fuel pump 34 that pumps fuel in the fuel tank 35 is disposed in the fuel supply pipe 33. Fuel that is pumped by the fuel pump 34 is supplied to the common rail 32 through the fuel supply pipe 33 and is directly injected into the combustion chamber 15 from the fuel injection valve 31 when the fuel injection valve 31 is opened.

The intake system 40 includes an intake manifold 41, an intake pipe 43, an air cleaner 44, a compressor 5a of an exhaust turbocharger 5, an intercooler 45, and a throttle valve 46. The intake port 17 of each cylinder 11 communicates with the intake manifold 41. The intake manifold 41 communicates with the air cleaner 44 through the intake pipe 43. The compressor 5a of the exhaust turbocharger 5 and the intercooler 45 are disposed in the intake pipe 43. The compressor 5a compresses and discharges an air intake flowing through the intake pipe 43. The intercooler 45 cools air compressed by the compressor 5a. The intercooler 45 is disposed on the downstream side of the compressor 5a in the direction in which the air intake flows. The throttle valve 46 is disposed within the intake pipe 43 between the intercooler 45 and the intake manifold 41. The throttle valve 46 can change the opening area of an intake channel by being pivoted by a throttle valve drive actuator 47. The intake port 17, the intake manifold 41, and the intake pipe 43 form the intake channel through which intake gas is supplied to the combustion chamber 15.

The exhaust system 50 includes an exhaust manifold 51, an exhaust pipe 52, a turbine 5b of the exhaust turbocharger 5, and an exhaust post-processing device 53. The exhaust port 18 of each cylinder 11 communicates with the exhaust manifold 51. The exhaust manifold 51 communicates with the exhaust pipe 52. The turbine 5b of the exhaust turbocharger 5 is disposed in the exhaust pipe 52. The turbine 5b is rotationally driven by the energy of exhaust gas. The compressor 5a and the turbine 5b of the exhaust turbocharger 5 are connected to each other by a rotating shaft. When the turbine 5b is rotationally driven, the compressor 5a rotates consequently, and the intake air is compressed. The exhaust post-processing device 53 is disposed in the exhaust pipe 52 on the downstream side of the turbine 5b in the direction in which the exhaust flows. The exhaust post-processing device 53 is a device for controlling and discharging the exhaust gas to the outer atmosphere. The exhaust post-processing device 53 includes various exhaust control catalysts for controlling hazardous substances, a filter that captures hazardous substances, and the like. The exhaust port 18, the exhaust manifold 51, and the exhaust pipe 52 form an exhaust channel through which the exhaust gas is discharged from the combustion chamber 15.

The EGR mechanism 60 includes an EGR pipe 61, an EGR control valve 62, and an EGR cooler 63. The EGR pipe 61 is connected to the exhaust manifold 51 and the intake manifold 41. The EGR pipe 61 provides communication between the exhaust manifold 51 and the intake manifold 41. The EGR cooler 63 that cools EGR gas flowing within the EGR pipe 61 is disposed in the EGR pipe 61. The EGR control valve 62 that can change the opening area of an EGR channel formed by the EGR pipe 61 is disposed in the EGR pipe 61. The flow rate of the EGR gas that is recirculated to the intake manifold 41 from the exhaust manifold 51 is adjusted by controlling the opening degree of the EGR control valve 62.

The control device 70 includes an electronic control unit (ECU) 71 and various sensors. The ECU 71 is configured with a digital computer, and includes a random access memory (RAM) 73, a read-only memory (ROM) 74, a CPU (microprocessor) 75, an input port 76, and an output port 77 that are connected to each other through a bidirectional bus 72.

A cylinder internal pressure sensor 81 for detecting the pressure within each cylinder 11 (cylinder internal pressure) is disposed in the cylinder head 13. A fuel pressure sensor 82 for detecting the pressure of fuel within the common rail 32, that is, the pressure of fuel injected into each cylinder 11 from the fuel injection valve 31 (injection pressure), is disposed in the common rail 32. A temperature sensor for detecting the temperature of air flowing within the intake pipe 43, and an air flow meter 84 that detects the flow rate of air flowing within the intake pipe 43, are disposed in the intake pipe 43 on the upstream side of the compressor 5a of the exhaust turbocharger 5 in the direction in which the intake flows. A throttle opening degree sensor 85 for detecting the opening degree of the throttle valve 46 (throttle opening degree) is disposed in the throttle valve 46. A pressure sensor 86 for detecting the pressure of the intake gas within the intake manifold 41, that is, the pressure of the intake gas taken into each cylinder 11 (intake pressure), is disposed in the intake manifold 41. A temperature sensor 87 for detecting the temperature of the intake gas within the intake manifold 41, that is, the temperature of the intake gas taken into each cylinder 11 (intake temperature), is disposed in the intake manifold 41. The output of each of the cylinder internal pressure sensor 81, the fuel pressure sensor 82, the temperature sensor, the air flow meter 84, the throttle opening degree sensor 85, the pressure sensor 86, and the temperature sensor 87 is input into the input port 76 through a corresponding AD converter 78.

A load sensor 89 that generates an output voltage in proportion to the amount of stepping on an accelerator pedal 88 is connected to the accelerator pedal 88. The output voltage of the load sensor 89 is input into the input port 76 through the corresponding AD converter 78. Accordingly, the amount of stepping on the accelerator pedal 88 is used as an engine load in the present embodiment. A crank angle sensor 90 generates an output pulse each time, for example, a crankshaft of the engine main body 10 rotates by, for example, 15 degrees. The output pulse is input into the input port 76. The CPU 75 calculates an engine rotational speed from the output pulse of the crank angle sensor 90.

The output port 77 of the ECU 71 is connected to, through a corresponding drive circuit 79, each actuator that controls operation of the internal combustion engine 1. In the example illustrated in FIG. 1 and FIG. 2, the output port 77 is connected to the fuel injection valve 31, the fuel pump 34, the throttle valve drive actuator 47, and the EGR control valve 62. The ECU 71 controls the operation of the internal combustion engine 1 by outputting a control signal for controlling the actuators from the output port 77.

The control device 70 configured as above includes an oxygen concentration controller and an injection controller.

The oxygen concentration controller controls an actuator that can change the oxygen concentration in the intake gas supplied to the combustion chamber 15 of the internal combustion engine 1. In the present embodiment, since the EGR mechanism 60 is disposed, a part of the exhaust gas is supplied to the combustion chamber 15 of each cylinder 11 again in accordance with the opening degree of the EGR control valve 62. When a valve overlap period in which both of the intake valve 21 and the exhaust valve 22 are opened can be changed, a part of the exhaust gas discharged to the exhaust port 18 is supplied to the combustion chamber 15 again in accordance with the valve overlap period. When the closing timing of the exhaust valve 22 can be changed, a part of the exhaust gas remains within the combustion chamber 15 without being discharged to the exhaust port 18 from the combustion chamber 15, in accordance with the closing timing of the exhaust valve 22. Hereinafter, the exhaust gas that remains or is supplied to the combustion chamber 15 will be referred to as the EGR gas. The EGR gas is the exhaust gas that is already combusted within the combustion chamber 15. Thus, the EGR gas barely includes oxygen. Thus, as the proportion of the EGR gas in the intake gas supplied to the combustion chamber 15 (EGR rate) is increased, the oxygen concentration in the intake gas is decreased. Accordingly, the oxygen concentration controller controls, specifically, the EGR control valve 62 or a variable valve mechanism when including a variable valve mechanism.

The injection controller controls the fuel injection valve 31 or the like based on the output of various sensors such that combustion can be performed in a desired manner within the combustion chamber 15. Specific injection control performed by the injection controller will be described in detail below.

Description of Combustion Mode

Figure 3A:
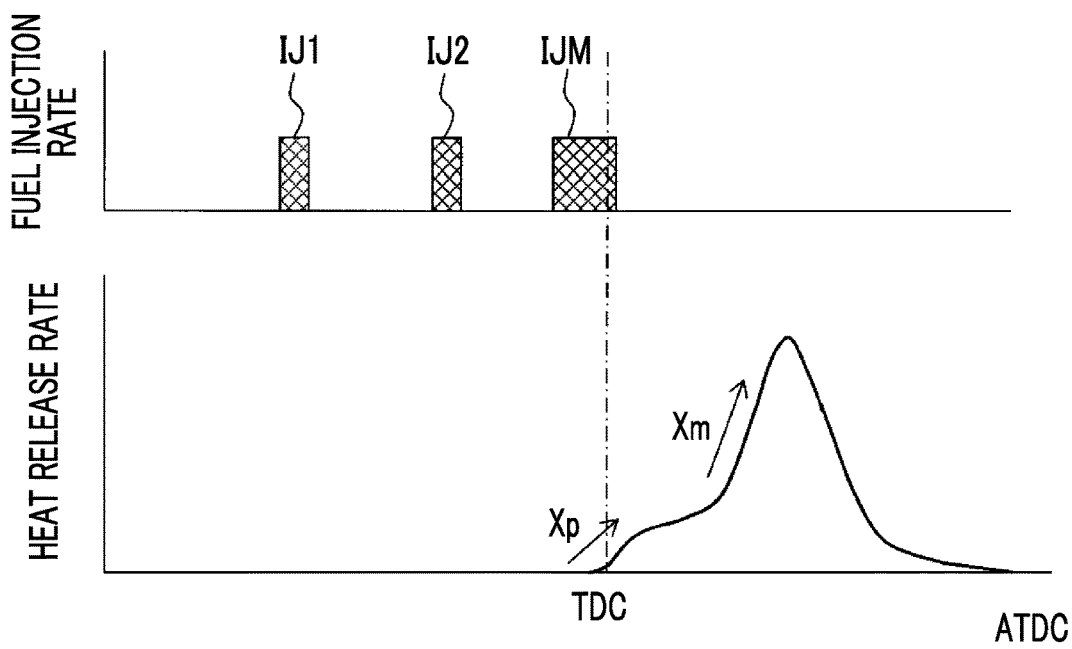
FIG. 3A is a diagram illustrating a change in fuel injection rate and heat release rate with respect to a crank angle when fuel is injected in a PCCI injection mode.
Figure 3B:
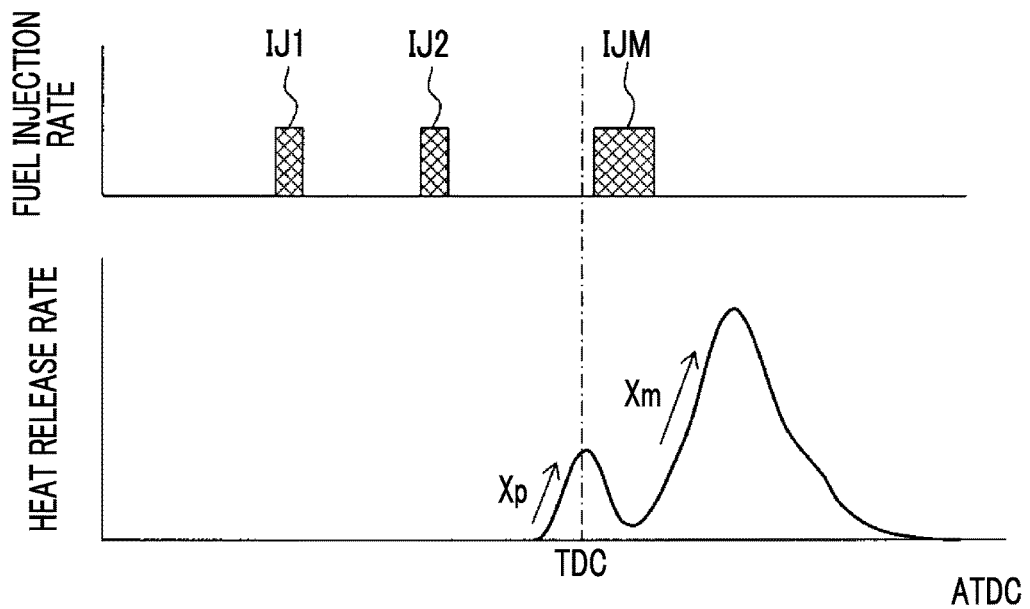
FIG. 3B is a diagram illustrating a change in fuel injection rate and heat release rate with respect to the crank angle when fuel is injected in a DC injection mode.
Figure 4:
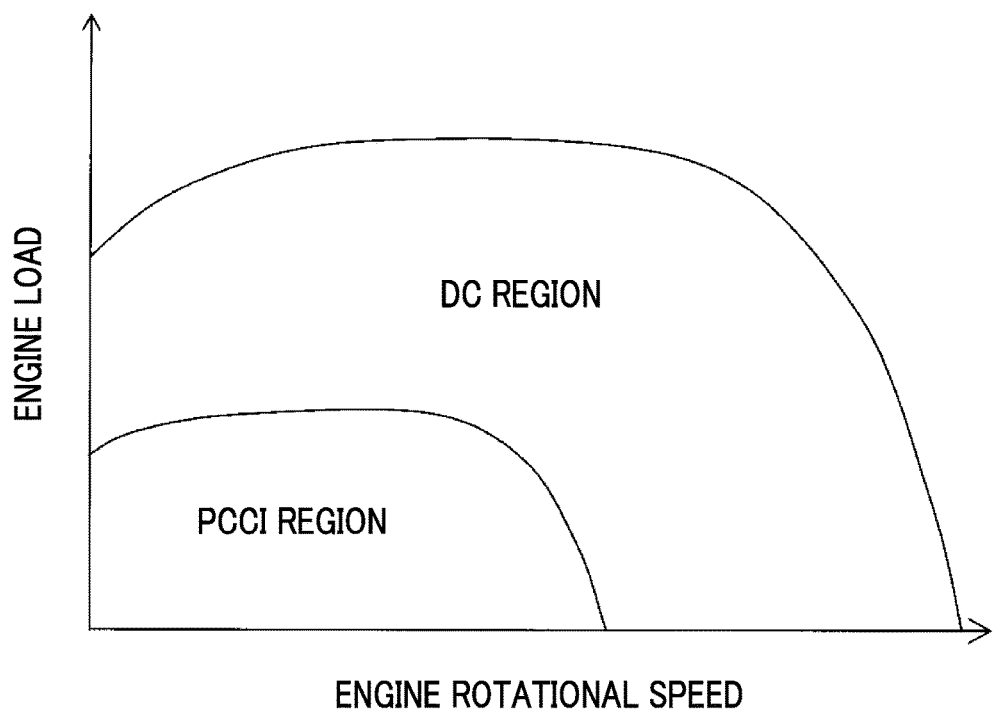
FIG. 4 is a diagram illustrating a relationship between an engine operating state and an injection mode.

Next, injection control performed by the injection controller of the control device 70 of the present embodiment during steady engine operation will be described with reference to FIG. 3A, FIG. 3B, and FIG. 4. In the present embodiment, during steady operation of the internal combustion engine 1, the injection controller of the control device 70 executes two injection modes of a PCCI injection mode (first injection mode) and a DC injection mode (second injection mode). In the PCCI injection mode, fuel is injected such that combustion based on premixed charge compression ignition (premixed-charge-based combustion) occurs. In the DC injection mode, fuel is injected such that combustion based on diffusive combustion (diffusion-based combustion) occurs. FIG. 3A and FIG. 3B are diagrams illustrating a change in fuel injection rate of the fuel injection valve 31 and heat release rate with respect to a crank angle. FIG. 4 is a diagram illustrating a relationship between an engine operating state and each injection region. The engine operating state is determined based on at least the engine load and the engine rotational speed.

FIG. 3A is a diagram illustrating a change in fuel injection rate and heat release rate with respect to the crank angle when the premixed charge compression ignition is performed mainly with fuel that is injected into the combustion chamber 15 by injecting fuel in the PCCI injection mode. As illustrated in FIG. 3A, in the present embodiment, a total of three fuel injections including two pre-injections IJ1, IJ2 and a main injection IJM are performed in the PCCI injection mode. Particularly, in the example illustrated in FIG. 3A, the main injection IJM is started before TDC and continues until around TDC. The first pre-injection IJ1 and the second pre-injection IJ2 are performed comparatively early.

When fuel is injected, first, an air-fuel mixture formed by the pre-injections IJ1, IJ2 self-ignites by compression, and the heat release rate is increased consequently (refer to an arrow Xp in FIG. 3A). The amount of fuel injected by the pre-injections IJ1, IJ2 is not large. Thus, the heat release rate is not significantly increased. Then, an air-fuel mixture formed by the main injection IJM self-ignites by compression, and the heat release rate is rapidly increased consequently (refer to an arrow Xm in FIG. 3A). The heat release rate is rapidly increased because the amount of fuel injected by the main injection IJM is comparatively large.

The main injection IJM is performed comparatively early in the PCCI injection mode. Thus, the main injection IJM is started before the air-fuel mixture formed by the pre-injections IJ1, IJ2 starts to combust (refers to hot flame reaction; does not include cool flame reaction). In other words, in the present embodiment, the injection controller controls fuel injection from the fuel injection valve 31 such that heat release from the air-fuel mixture formed by the pre-injections IJ1, IJ2 is started after the start of the main injection IJM in the PCCI injection mode.

When fuel is injected in the PCCI injection mode, most of the fuel injected by the main injection IJM combusts after a certain amount of a time period of premixing with air after fuel injection, since the main injection IJM is performed comparatively early. That is, in such a case, most of the fuel injected by the main injection IJM combusts after a comparatively long ignition delay time period (for example, longer than or equal to 0.2 ms). Such a form of combustion of the air-fuel mixture is referred to as the premixed charge compression ignition. Thus, the premixed charge compression ignition is mainly performed in the PCCI injection mode.

In the present embodiment, the PCCI injection mode has two pre-injections and one main injection. The number of times, the injection amount, and the injection timing of the pre-injection and the main injection in the PCCI injection mode may be any number of times, any injection amount, and any injection timing, provided that heat release from the air-fuel mixture formed by the pre-injections IJ1, IJ2 is started after the start of the main injection IJM.

FIG. 3B is a diagram illustrating a change in fuel injection rate and heat release rate with respect to the crank angle when the diffusive combustion is performed mainly with fuel that is injected into the combustion chamber 15 by injecting fuel in the DC injection mode. As illustrated in FIG. 3B, in the present embodiment, a total of three fuel injections including the two pre-injections IJ1, IJ2 and the main injection IJM are performed in the DC injection mode. Particularly, in the example illustrated in FIG. 3B, the main injection IJM is started after TDC. The first pre-injection IJ1 and the second pre-injection IJ2 are performed comparatively early.

When fuel is injected, first, an air-fuel mixture formed by the pre-injections IJ1, IJ2 self-ignites by compression, and the heat release rate is increased consequently (refer to the arrow Xp in FIG. 3B). Since the amount of fuel injected by the pre-injections IJ1, IJ2 is not large, the heat release rate is not significantly increased. Once the heat release rate reaches a peak, the heat release rate is decreased. The temporary increase in heat release rate causes an increase in temperature and pressure within the combustion chamber 15. Accordingly, an air-fuel mixture formed by the main injection IJM combusts, and the heat release rate is rapidly increased consequently (refer to an arrow Xm in FIG. 3B). The heat release rate is rapidly increased because the amount of fuel injected by the main injection IJM is comparatively large.

The main injection IJM is performed later in the DC injection mode than in the PCCI injection mode. Thus, the main injection IJM is started after the air-fuel mixture formed by the pre-injections IJ1, IJ2 starts to combust (refers to hot flame reaction; does not include cool flame reaction). In other words, in the present embodiment, the injection controller controls fuel injection from the fuel injection valve 31 such that heat release from the air-fuel mixture formed by the pre-injections IJ1, IJ2 is started before the start of the main injection IJM in the DC injection mode.

When fuel is injected in the DC injection mode, the main injection IJM is started after the air-fuel mixture formed by the pre-injections IJ1, IJ2 starts to combust. Thus, the temperature and pressure within the combustion chamber 15 are high at the start of the main injection IJM, and most of the fuel injected by the main injection IJM combusts without a delay. That is, in such a case, most of the fuel injected by the main injection IJM combusts after a comparatively short ignition delay time period (for example, shorter than 0.2 ms). Such a form of combustion of the air-fuel mixture is referred to as the distributive combustion. Thus, the distributive combustion is mainly performed in the DC injection mode.

In the present embodiment, the DC injection mode has two pre-injections and one main injection. The number of times, the injection amount, and the injection timing of the pre-injection and the main injection in the DC injection mode may be any number of times, any injection amount, and any injection timing, provided that heat release from the air-fuel mixture formed by the pre-injections IJ1, IJ2 is started after the start of the main injection IJM.

When the distributive combustion and the premixed charge compression ignition are compared with each other, the air-fuel premixture in the premixed charge compression ignition is combusted after a certain amount of period of premixing fuel with air after fuel injection. Consequently, fuel is dispersed during the premixing period, and the proportion of fuel combusting in the state of a high fuel concentration (that is, the state of a high equivalence ratio $\varphi$) can be reduced. When an air-fuel mixture having a high fuel concentration combusts, soot is generated due to a lack of oxygen. Thus, the premixed charge compression ignition can reduce generation of soot and improve exhaust emission.

When the engine operating state is in a high load operating state, the premixed charge compression ignition cannot be performed. The reason is because when the engine operating state is in the high load operating state, the temperature within the combustion chamber 15 is increased, and the air-fuel premixture self-ignites early.

In the distributive combustion, the air-fuel mixture formed by the main injection IJM is not premixed. Thus, even when the temperature within the combustion chamber 15 is increased, self-ignition of an air-fuel premixture formed by the main injection IJM does not occur. Thus, even when the engine operating state is in the high load operating state, the distributive combustion can be performed.

In the distributive combustion, fuel combusts almost without a delay after fuel injection, and fuel combusts without being sufficiently dispersed. Thus, the proportion of fuel combusting in the state of a high fuel concentration is increased, and soot is likely to be generated. Accordingly, soot is more likely to be discharged from the combustion chamber 15 than in the premixed charge compression ignition.

In the present embodiment, as illustrated in FIG. 4, the injection controller sets the injection mode to the PCCI injection mode when the engine operating state is in a PCCI region having a low engine load and engine rotational speed. The injection controller sets the injection mode to the DC injection mode when the engine operating state is in a DC region having a high engine load or engine rotational speed. Accordingly, when the engine load and the engine rotational speed are high, operation of the internal combustion engine can be maintained by performing the distributive combustion. When the engine load and the engine rotational speed are low, generation of soot within the combustion chamber 15 can be reduced by performing the premixed charge compression ignition.

Setting of EGR Rate

Figure 5A:
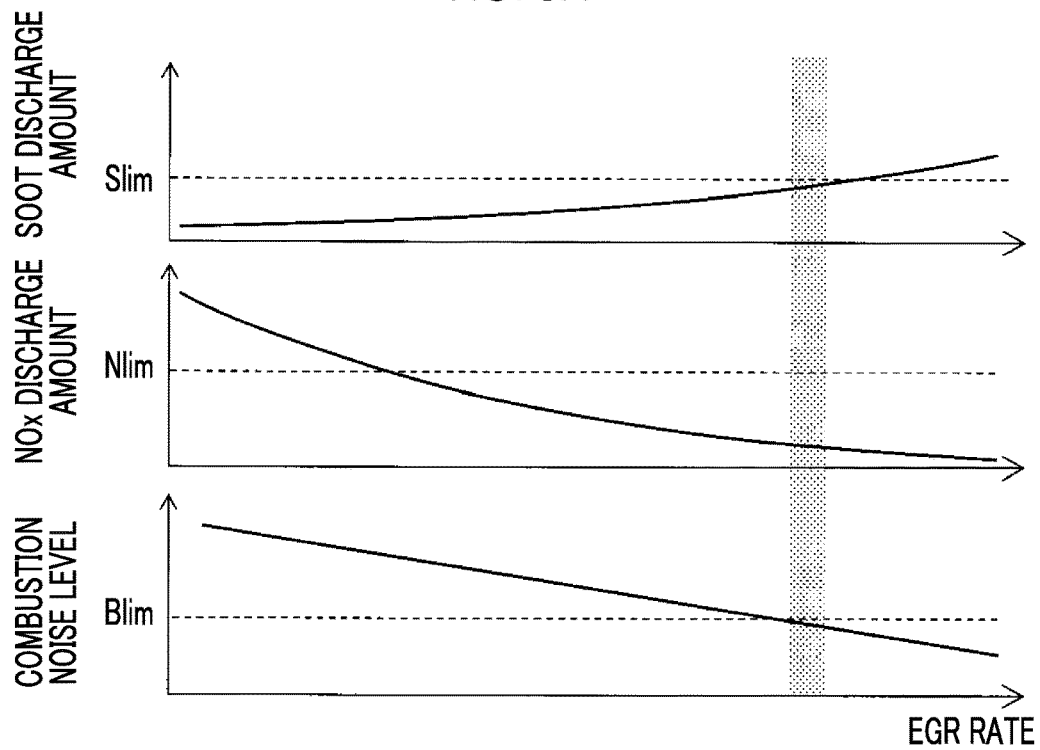
FIG. 5A is a diagram illustrating the amount of discharge of soot and NOx from a combustion chamber and a combustion noise level when fuel is injected in the PCCI injection mode illustrated in FIG. 3A.
Figure 5B:
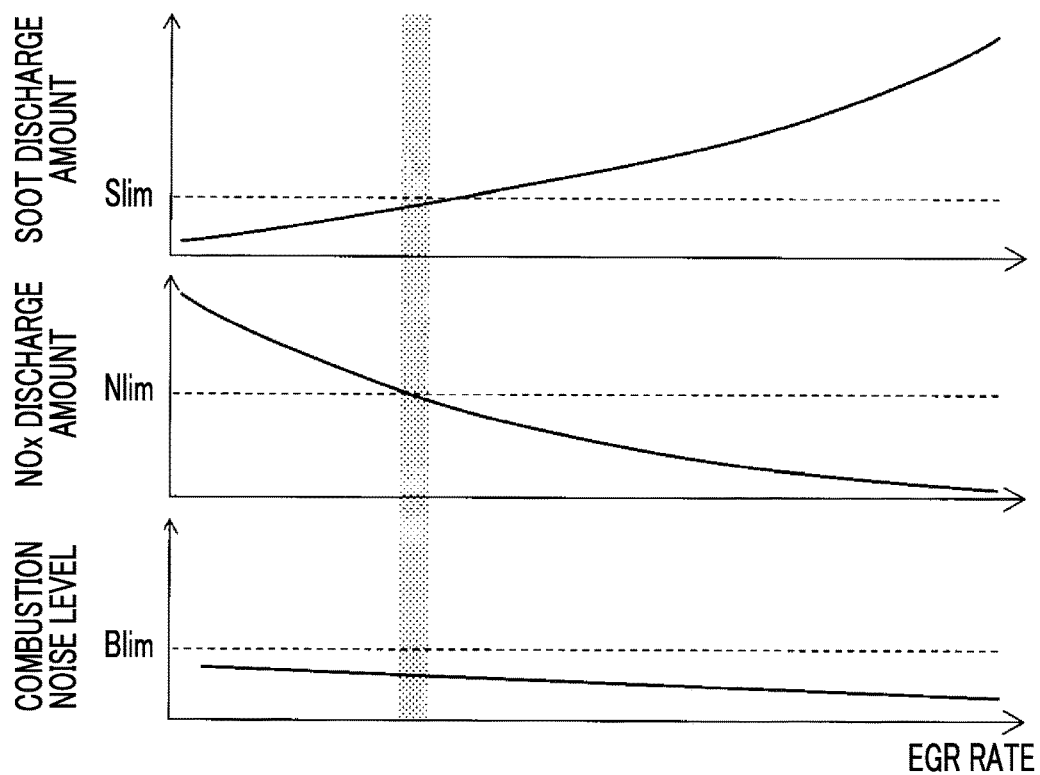
FIG. 5B is a diagram illustrating the amount of discharge of soot and NOx from the combustion chamber and the combustion noise level when fuel is injected in the DC injection mode illustrated in FIG. 3B.

Next, setting of a target EGR rate during steady engine operation will be described with reference to FIG. 5A and FIG. 5B. FIG. 5A illustrates the amount of discharge of soot (SOOT) and NOx from the combustion chamber 15 when fuel is injected in the PCCI injection mode illustrated in FIG. 3A. FIG. 5B illustrates the amount of discharge of soot and NOx from the combustion chamber 15 when fuel is injected in the DC injection mode illustrated in FIG. 3B. In FIG. 5A and FIG. 5B, Slim denotes the upper limit value of the amount of discharge of soot from the combustion chamber 15, and Nlim denotes the upper limit value of the amount of discharge of NOx from the combustion chamber 15. Slim and Nlim are set by considering a regulation value or the control capability of the exhaust post-processing device 53.

As illustrated in FIG. 5A, when fuel is injected in the PCCI injection mode, the amount of soot discharged from the combustion chamber 15 is increased as the EGR rate of the intake gas supplied into the combustion chamber 15 is increased, that is, as the oxygen concentration in the intake gas is decreased. The reason is that as the oxygen concentration is decreased, incomplete combustion is more likely to occur, and consequently, soot is more likely to be generated within the combustion chamber 15. When fuel is injected in the PCCI injection mode, the amount of NOx discharged from the combustion chamber 15 is decreased as the EGR rate of the intake gas supplied into the combustion chamber 15 is increased, that is, as the oxygen concentration in the intake gas is decreased. The reason is that as the oxygen concentration is decreased, heat that is released from combustion is used to increase the temperature of inert gas (EGR gas), and consequently, the combustion temperature of the air-fuel mixture is decreased. When fuel is injected in the PCCI injection mode, a combustion noise level is decreased as the EGR rate of the intake gas supplied into the combustion chamber 15 is increased, that is, as the oxygen concentration in the intake gas is decreased. The reason is that while combustion is promptly performed in the state of a high oxygen concentration, combustion is gradually performed in the state of a low oxygen concentration.

When fuel is injected in the PCCI injection mode, combustion is performed after a certain amount of the premixing period. Thus, the proportion of fuel combusting in the state of a high fuel concentration is small, and the amount of soot generated is reduced. Thus, in the PCCI injection mode, the amount of discharge of soot is not significantly increased even when the EGR rate is increased, that is, even when the oxygen concentration is decreased. As the EGR rate is increased, that is, as the oxygen concentration is decreased, the amount of discharge of NOx is decreased, and the combustion noise level is also decreased. In the present embodiment, when fuel is injected in the PCCI injection mode, the oxygen concentration controller performs control such that the EGR rate becomes equal to a comparatively high predetermined value (a value within a hatched region in FIG. 5A), that is, the oxygen concentration becomes equal to a comparatively low predetermined value. Accordingly, the amount of discharge of soot can be reduced, and the amount of discharge of NOx and the combustion noise level can be decreased.

As illustrated in FIG. 5B, when fuel is injected in the DC injection mode, the amount of soot discharged from the combustion chamber 15 is increased as the EGR rate of the intake gas supplied into the combustion chamber 15 is increased, that is, as the oxygen concentration in the intake gas is decreased. The amount of NOx discharged from the combustion chamber 15 is decreased, and the combustion noise level is decreased. When fuel is injected in the DC injection mode, most of the fuel injected by the main injection combusts almost without a delay, and premixing is barely performed. Thus, most of the fuel combusts in the state of a high fuel concentration, and soot is likely to be generated. In addition, since combustion occurs more gradually in the distributive combustion than in the premixed charge compression ignition, the combustion noise level when fuel is injected in the DC injection mode is less than in the PCCI injection mode. In the present embodiment, when fuel is injected in the DC injection mode, the oxygen concentration controller performs control such that the EGR rate becomes equal to a comparatively low predetermined value (within a hatched region in FIG. 5B), that is, the oxygen concentration becomes equal to a comparatively high predetermined value. Accordingly, the amount of discharge of soot can be reduced even when fuel is injected in the DC injection mode. The EGR rate is set such that the amount of discharge of NOx is less than or equal to the upper limit value Nlim. Accordingly, the amount of discharge of NOx can be reduced to or below the upper limit value Nlim.

Accordingly, in the present embodiment, the target EGR rate is set to a comparatively high predetermined value when fuel is injected in the PCCI injection mode, and the target EGR rate is set to a comparatively low predetermined value when fuel is injected in the DC injection mode. That is, in the present embodiment, a target oxygen concentration is set to a comparatively low predetermined value when fuel is injected in the PCCI injection mode, and the target oxygen concentration is set to a comparatively high predetermined value when fuel is injected in the DC injection mode. More accurately, when the engine operating state is in the PCCI region having a low engine load and engine rotational speed, the target oxygen concentration is set to a comparatively low predetermined value. When the engine operating state is in the DC region having a high engine load or engine rotational speed, the target oxygen concentration is set to a comparatively high predetermined value.

Delay at Switching Transition

When the injection mode is switched between the PCCI injection mode and the DC injection mode, the form of injection such as the injection timing or the injection amount of each fuel injection (the main injection and the pre-injection) needs to be switched, and the oxygen concentration also needs to be switched. While the form of injection can be promptly switched, a response delay may occur in switching of the oxygen concentration.

FIG. 6 is a timing chart of the engine load, the total amount of fuel injected from the fuel injection valve 31, and the oxygen concentration in the intake gas supplied to the combustion chamber 15. The example illustrated in FIG. 6 is an illustration of when the engine load is increased stepwise at time $t_0$ and exceeds a reference load Lref between the PCCI region and the DC region.

As illustrated in FIG. 6, the total amount of fuel injected from the fuel injection valve 31 is rapidly increased due to the rapid increase in engine load at time $t_0$. While the example illustrated in FIG. 6 illustrates the total amount of injected fuel, the injection timing and the injection amount of the pre-injection or the main injection are also switched to the injection timing and the injection amount in the DC injection mode from the injection timing and the injection amount in the PCCI injection mode at time $t_0$.

The speed of response of the EGR rate is slow. Even when the EGR control valve 62 is operated to decrease the EGR rate at time $t_0$, the actual EGR rate is gradually decreased. Accordingly, the oxygen concentration in the intake gas flowing into the combustion chamber 15 is also gradually increased from time $t_0$. A switching transition state in which the actual EGR rate is gradually changed toward the target EGR rate occurs when the injection mode is switched to the DC injection mode from the PCCI injection mode. Consequently, when the injection mode is switched to the DC injection mode from the PCCI injection mode due to an increase in engine load, there is a period in which the internal combustion engine is operated in the state of a low oxygen concentration (the state of a high EGR rate) with fuel injected in accordance with the DC injection mode during transition in the switching. In such a case, combustion is performed in a region on the right side of the hatched region in FIG. 5B, and the amount of discharge of soot is increased.

When the engine load is decreased unlike the example illustrated in FIG. 6, a response delay also occurs in switching of the oxygen concentration. Accordingly, the switching transition state in which the actual EGR rate is gradually changed toward the target EGR rate occurs even when the injection mode is switched to the PCCI injection mode from the DC injection mode. Consequently, when the injection mode is switched to the PCCI injection mode from the DC injection mode due to a decrease in engine load, there is a period in which the internal combustion engine is operated in the state of a high oxygen concentration (the state of a low EGR rate) with fuel injected in accordance with the PCCI injection mode during transition in the switching. In such a case, combustion is performed in a region on the left side of the hatched region in FIG. 5A, and the combustion noise level is increased.

Control at Switching Transition of Injection Mode

In the present embodiment, when the injection mode is switched between the PCCI injection mode and the DC injection mode, fuel is injected in an injection mode different from the PCCI injection mode and the DC injection mode during transition in the switching. Specifically, in the present embodiment, fuel is injected in two injection modes of a PCCI-based switching mode (first switching mode) and a DC-based switching mode (second switching mode) during transition in switching. Hereinafter, the switching modes will be described with reference to FIG. 7A and FIG. 7B.

PCCI-Based Switching Mode

Figure 7A:
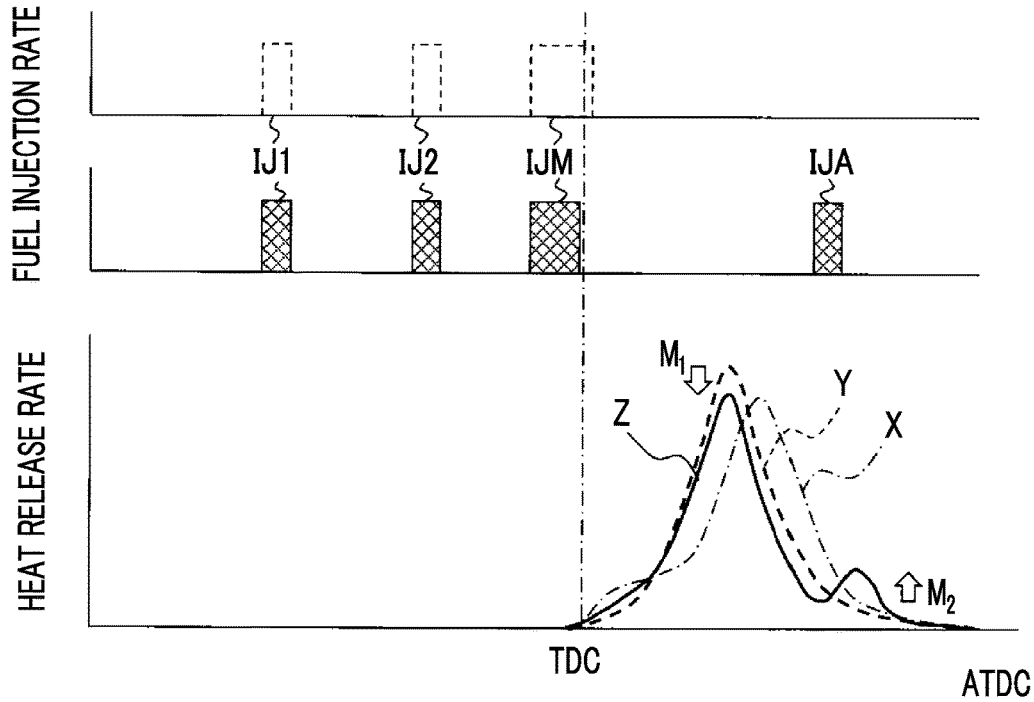
FIG. 7A is a diagram illustrating a change in fuel injection rate and heat release rate with respect to the crank angle when fuel is injected in a PCCI-based switching mode.

FIG. 7A is a diagram illustrating a change in fuel injection rate and heat release rate with respect to the crank angle when fuel is injected in the PCCI-based switching mode. A broken line in FIG. 7A indicates a change in fuel injection rate when fuel is injected in the PCCI injection mode. A solid line in FIG. 7A indicates a change in fuel injection rate when fuel is injected in the PCCI-based switching mode.

A change in heat release rate when fuel is injected in the PCCI injection mode in the state of an appropriate oxygen concentration is denoted by X in FIG. 7A. A change in heat release rate when fuel is injected in the PCCI injection mode in the state of a high oxygen concentration due to transition in switching is denoted by Y in FIG. 7A. A change in heat release rate when fuel is injected in the PCCI-based switching mode in the state of a high oxygen concentration is denoted by Z in FIG. 7A.

In the PCCI-based switching mode, fuel is basically injected in the same form of injection as the PCCI injection mode. Thus, even in the PCCI-based switching mode, injection of fuel from the fuel injection valve 31 is controlled such that heat release from the air-fuel mixture formed by the pre-injections IJ1, IJ2 is started after the start of the main injection IJM. However, while the engine load is the same in the PCCI injection mode, the PCCI-based switching mode has a decrease in the injection amount of the main injection IJM, and a post-injection IJA that is performed after the main injection IJM. Hereinafter, such an operation will be specifically described.

Decrease in Injection Amount of Main Injection

The change X in heat release rate when fuel is injected in the PCCI injection mode in the state of an appropriate oxygen concentration (during steady operation) is compared with the change Y in heat release rate when fuel is injected in the PCCI injection mode in the state of a high oxygen concentration (during transition in switching). As is understood from the comparison, both the maximum speed of increase in heat release rate and the peak value of the heat release rate are larger in the state of a high oxygen concentration than in the state of an appropriate oxygen concentration. As the maximum speed of increase in heat release rate and the peak value of the heat release rate are increased, the combustion noise level is increased. Thus, the combustion noise level is increased in the state of a high oxygen concentration further than in the state of an appropriate oxygen concentration.

In the PCCI-based switching mode, the injection amount of the main injection IJM is decreased below the injection amount of the main injection in the PCCI injection mode in order to reduce the combustion noise level. Accordingly, as illustrated by an arrow $M_1$ in FIG. 7A, the peak value of the heat release rate acquired by combustion of the air-fuel mixture formed by the main injection IJM is decreased. In addition, the maximum speed of increase in heat release rate (that is, the maximum value of the gradient of the heat release rate) is also decreased. Consequently, when fuel is injected in the PCCI-based switching mode, the combustion noise level is reduced by a larger amount than when fuel is injected in the PCCI injection mode. Specifically, the amount of decrease in the main injection IJM in the PCCI-based switching mode is set such that the combustion noise level becomes equal to a desired combustion noise level.

Execution of Post-Injection

When the injection amount of the main injection IJM is decreased, the total amount of heat release is decreased, and the output torque of the internal combustion engine 1 is decreased. Therefore, the post-injection IJA is performed after the main injection IJM in the PCCI-based switching mode. Hereinafter, the injection timing and the injection amount of the post-injection IJA will be described.

Figure 8A:
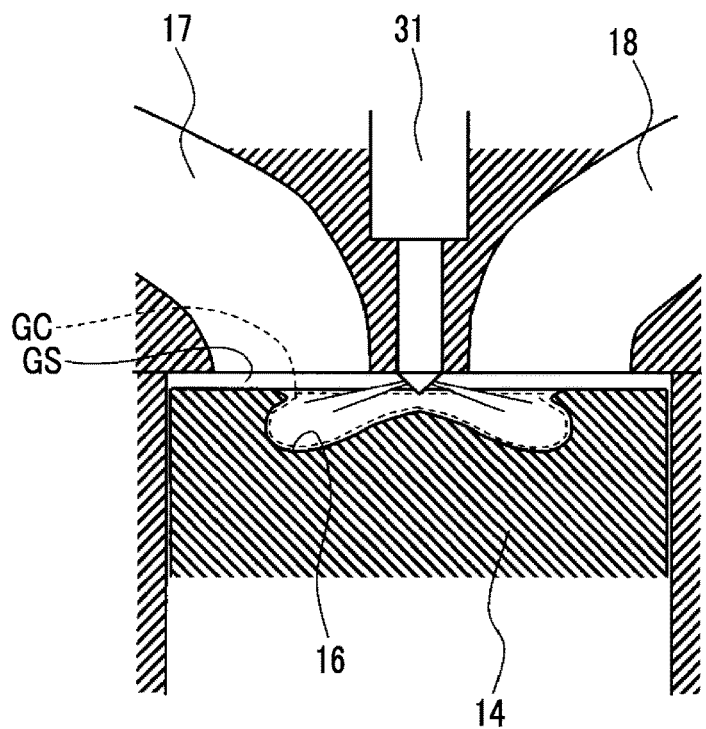
FIG. 8A is a schematic sectional view of the engine main body in the vicinity of the combustion chamber when a piston is at a compression top dead center.
Figure 8B:
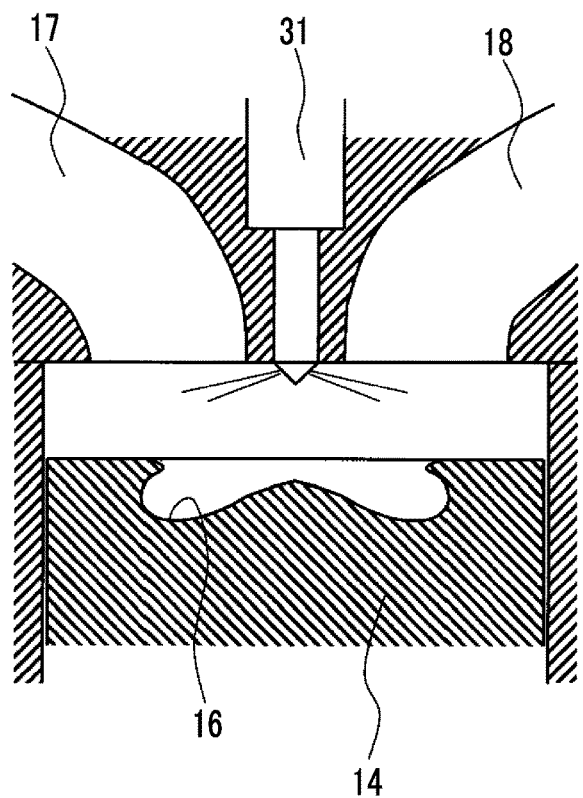
FIG. 8B is a schematic sectional view of the engine main body in the vicinity of the combustion chamber when the piston is in a position below the compression top dead center.

First, the injection timing of the post-injection IJA will be described with reference to FIG. 8A and FIG. 8B. FIG. 8A is a schematic sectional view of the engine main body 10 in the vicinity of the combustion chamber 15 when the piston 14 is at a compression top dead center. FIG. 8B is a schematic sectional view of the engine main body 10 in the vicinity of the combustion chamber 15 when the piston 14 is in a position below the compression top dead center.

As is understood from FIG. 8A, when fuel is injected from the fuel injection valve 31 at the time of the piston 14 being at the compression top dead center, the injected fuel enters the cavity 16 formed in the piston 14. As is understood from FIG. 8B, when the piston 14 moves down by a certain distance from the compression top dead center, fuel injected from the fuel injection valve 31 does not enter the cavity 16. Accordingly, while fuel that is injected from the fuel injection valve 31 with a crank angle advanced from a predetermined reference crank angle enters the cavity 16, fuel that is injected from the fuel injection valve 31 with a crank angle retarded from the predetermined reference crank angle does not enter the cavity 16.

The main injection IJM that is performed before the post-injection IJA is performed when the piston 14 is in the vicinity of the compression top dead center. Thus, fuel is injected into the cavity 16 in the main injection IJM, and combustion mainly occurs within the cavity. Accordingly, oxygen that is included in the intake gas within the cavity 16 (GC in FIG. 8A) is mainly consumed in the combustion of fuel injected by the main injection IJM. In other words, oxygen that is included in the intake gas outside the cavity 16 (GS in FIG. 8A; the intake gas within a squish region or the like) is not consumed in the combustion of fuel injected by the main injection IJM. Thus, after combustion in the main injection IJM is finished, oxygen that is not consumed in the combustion in the main injection IJM mostly remains outside the cavity 16 rather than within the cavity 16.

In the present embodiment, the post-injection IJA is performed in the PCCI-based switching mode at a timing at which injected fuel does not enter the cavity 16. That is, in the PCCI-based switching mode, fuel is injected from the fuel injection valve 31 with a crank angle retarded from the reference crank angle. Accordingly, fuel can be injected by the post-injection IJA into the region in which oxygen that is not consumed in the combustion in the main injection IJM mostly remains. Consequently, fuel that is injected by the post-injection IJA is also appropriately mixed with oxygen, and generation of soot or the like due to a local lack of oxygen can be reduced.

Next, the injection amount of the post-injection IJA will be described. Even injection of the same amount of fuel results in larger output torque when fuel is injected at the injection timing of the main injection IJM than when fuel is injected at the injection timing of the post-injection IJA. The reason is that thermal energy is likely to be converted into kinetic energy when combustion occurs in the vicinity of the compression top dead center. Accordingly, the output torque is decreased when the injection amount of the post-injection IJA is the same as the amount of decrease in the main injection IJM. Thus, in the present embodiment, the injection amount of the post-injection IJA is set to be larger than the amount of decrease in the main injection IJM such that the output torque is not changed before and after the decrease in the injection amount of the main injection IJM. Particularly, as the injection timing of the post-injection IJA is retarded away from the compression top dead center, the contribution ratio of fuel injected by the post-injection IJA with respect to the output torque is decreased. Thus, as the injection timing of the post-injection IJA is retarded, the injection amount of the post-injection IJA is increased.

As described above, by performing the post-injection IJA after the main injection IJM, the heat release rate is increased as illustrated by an arrow $M_2$ in FIG. 7A due to combustion of fuel injected by the post-injection IJA. Accordingly, the total amount of heat release from combustion of fuel is maintained almost the same, and a decrease in output torque can be reduced.

In the embodiment, the post-injection IJA in the PCCI-based switching mode is performed at a timing at which injected fuel does not enter the cavity 16. The post-injection IJA does not have to be performed at such a timing from the viewpoint of maintaining the output torque. However, when the post-injection is too close in time to the main injection, the effect of reducing the combustion noise level by decreasing the injection amount of the main injection cannot be sufficiently achieved. Accordingly, the post-injection IJA is performed at least after the heat release from combustion of the air-fuel mixture formed by the main injection IJM is started.

Control of Injection Pressure

As described above, the contribution ratio of fuel injected by the post-injection IJA with respect to the output torque is smaller than the contribution ratio of fuel injected by the main injection IJM with respect to the output torque. Thus, when the amount of decrease in the main injection IJM is excessively increased, and the injection amount of the post-injection IJA is excessively increased consequently, fuel consumption deteriorates. When the injection amount of the post-injection IJA is increased, the amount of non-combusted fuel flowing out of the combustion chamber 15 without being combusted is also increased. Accordingly, the injection amount of the post-injection IJA should not be increased above a certain boundary amount.

Therefore, the boundary amount of the post-injection IJA may be set in advance. When the amount of decrease in the main injection calculated from the combustion noise level becomes greater than or equal to the boundary amount, the fuel pump 34 or the like may be controlled such that the amount of decrease in the main injection is maintained at the boundary amount, and that the pressure of injection from the fuel injection valve 31 is reduced. The injection pressure is reduced further than the injection pressure at the time of performing the PCCI injection mode. Reducing the injection pressure decreases the degree of mixing between fuel injected by the main injection IJM or the like and the intake gas. Thus, a rapid increase in heat release rate is reduced, and the peak value of the heat release rate is decreased. Accordingly, an increase in combustion noise level can be reduced.

That is, in such a case, when fuel is injected in the PCCI-based switching mode, the injection controller decreases the fuel injection amount of the main injection further than the fuel injection amount of the main injection in the PCCI injection mode such that the combustion noise level becomes equal to a target combustion noise level is achieved. When the amount of decrease becomes greater than or equal to the boundary amount set in advance, the injection controller maintains the amount of decrease at the predetermined boundary amount and decreases the injection pressure of the main injection further than the injection pressure of the main injection in the PCCI injection mode.

DC-Based Switching Mode

Figure 7B:
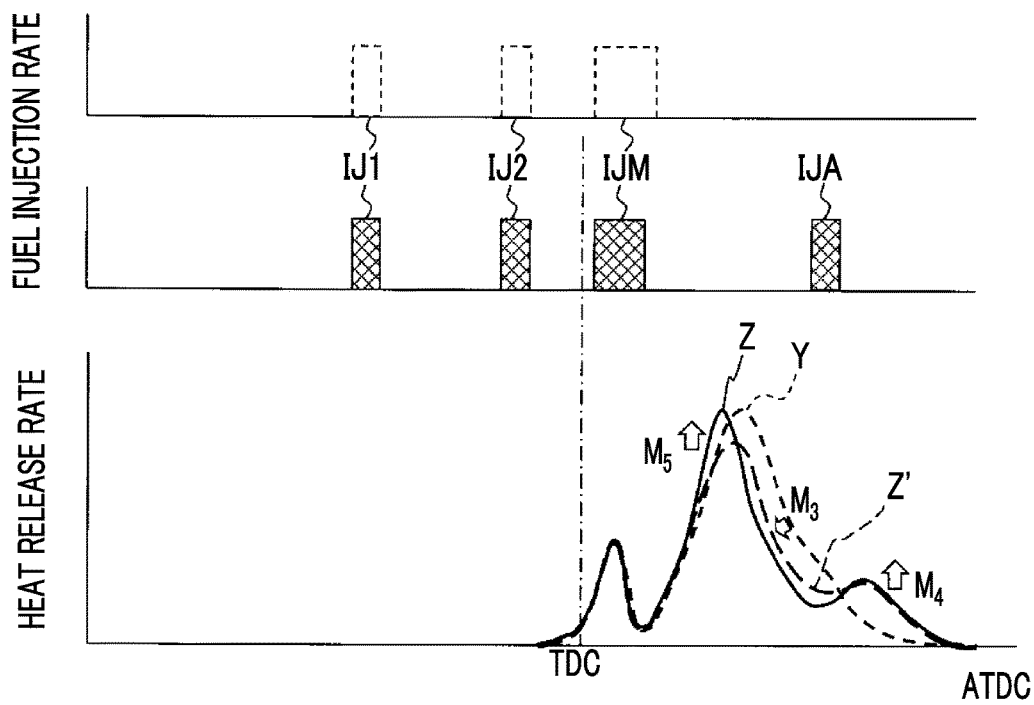
FIG. 7B is a diagram illustrating a change in fuel injection rate and heat release rate with respect to the crank angle when fuel is injected in a DC-based switching mode.

FIG. 7B is a diagram illustrating a change in fuel injection rate and heat release rate with respect to the crank angle when fuel is injected in the DC-based switching mode. A broken line in FIG. 7B indicates a change in fuel injection rate when fuel is injected in the DC injection mode. A solid line in FIG. 7B indicates a change in fuel injection rate when fuel is injected in the DC-based switching mode.

A change in heat release rate when fuel is injected in the DC injection mode in the state of a low oxygen concentration due to transition in switching is denoted by Y in FIG. 7B. A change in heat release rate when fuel is injected in the DC-based switching mode in the state of a low oxygen concentration is denoted by Z in FIG. 7B. A change in heat release rate when fuel is injected in the DC-based switching mode with the injection pressure maintained at the same level as the injection pressure in the DC injection mode is denoted by Z' in FIG. 7B.

In the DC-based switching mode, fuel is basically injected in the same form of injection as the DC injection mode. Accordingly, even in the DC-based switching mode, injection of fuel from the fuel injection valve 31 is controlled such that heat release from the air-fuel mixture formed by the pre-injections IJ1, IJ2 is started before the start of the main injection IJM. However, while the engine load is the same in the DC injection mode, the DC-based switching mode has a decrease in the injection amount of the main injection IJM, and the post-injection IJA that is performed after the main injection IJM. Hereinafter, such an operation will be specifically described.

Injection Amount of Main Injection

The amount of soot generated when combustion occurs within the combustion chamber 15 is changed in accordance with the ratio of the mass of oxygen to the mass of oxygen being present in the region in which the combustion is performed (mass of oxygen/mass of fuel; hereinafter, referred to as an "oxygen/fuel ratio"). As the oxygen/fuel ratio is increased, an excessive amount of oxygen is present at the time of combustion, and soot is more unlikely to be generated. Conversely, as the oxygen/fuel ratio is decreased, an insufficient amount of oxygen is present at the time of combustion, and soot is more likely to be generated. Considering a boundary amount of soot discharged from the combustion chamber 15, the oxygen/fuel ratio needs to be maintained at or above a boundary value that is determined from the boundary amount.

As described with reference to FIG. 8A, when fuel is injected from the fuel injection valve 31 at the time of the piston 14 being in the vicinity of the compression top dead center, the injected fuel enters the cavity 16 formed in the piston 14. The main injection IJM is performed in the vicinity of the compression top dead center even in the DC injection mode and the DC-based switching mode. Thus, most of the injected fuel enters the cavity 16. Consequently, combustion of fuel injected by the main injection IJM is mostly performed within the cavity 16.

Accordingly, the amount of soot generated when fuel injected by the main injection IJM combusts can be said to be changed in accordance with the ratio of the mass of oxygen to the mass of fuel being present within the cavity 16 which is the region in which the combustion is mainly performed. Accordingly, maintaining the oxygen/fuel ratio within the cavity 16 at or above the boundary value can reduce the amount of discharge of soot from the combustion chamber 15 to or below the boundary amount.

In the present embodiment, in the DC-based switching mode, the injection amount of the main injection IJM is set such that the oxygen/fuel ratio within the cavity 16 at the end of the main injection IJM is greater than or equal to the boundary value. Specifically, the mass of oxygen within the cavity 16 at the end of the main injection IJM is calculated based on the EGR rate of the intake gas supplied into the combustion chamber 15, the amount of air intake, a boost pressure, the temperature of intake, the crank angle at the end of the main injection IJM, and the like. Then, the injection amount of the main injection IJM that achieves the oxygen/fuel ratio equal to the boundary value is calculated from the calculated mass of oxygen.

The injection amount of the main injection IJM calculated as above is smaller than the injection amount of the main injection IJM in the DC injection mode in which the engine load is the same. Accordingly, in the DC-based switching mode, the injection amount of the main injection IJM is decreased further than in the DC injection mode in which the engine load is the same. When the injection amount of the main injection IJM is decreased as above, (Z' in FIG. 7B), the heat release rate is decreased as illustrated by an arrow $M_3$ in FIG. 7B by a larger amount than when fuel is injected in the DC injection mode (Y in FIG. 7B).

Execution of Post-Injection

When the injection amount of the main injection IJM is decreased, the total amount of heat release is decreased, and the output torque of the internal combustion engine 1 is decreased. Therefore, even in the DC-based switching mode, the post-injection IJA is performed after the main injection IJM in the same manner as the PCCI-based switching mode.

As described with the PCCI-based switching mode, the injection timing of the post-injection IJA is performed at a timing at which injected fuel does not enter the cavity 16. That is, even in the DC-based switching mode, fuel is injected from the fuel injection valve 31 with a crank angle retarded from the reference crank angle. Accordingly, generation of soot or the like due to a local lack of oxygen can be reduced.

Even in the DC-based switching mode, the injection amount of the post-injection IJA is set to be larger than the amount of decrease in the main injection IJM such that the output torque is not changed before and after the decrease in the injection amount of the main injection IJM. Particularly, as the injection timing of the post-injection IJA is retarded away from the compression top dead center, the contribution ratio of fuel injected by the post-injection IJA with respect to the output torque is decreased. Thus, as the injection timing of the post-injection IJA is retarded, the injection amount of the post-injection IJA is increased.

As described above, by performing the post-injection IJA after the main injection IJM, the heat release rate is increased as illustrated by an arrow $M_4$ in FIG. 7B due to combustion of fuel injected by the post-injection IJA. Accordingly, the total amount of heat release from combustion of fuel is maintained almost the same, and a decrease in output torque can be reduced.

In the embodiment, the post-injection IJA in the DC-based switching mode is performed at a timing at which injected fuel does not enter the cavity 16. The post-injection IJA does not have to be performed at such a timing from the viewpoint of maintaining the output torque. However, when the post-injection is too close in time to the main injection, the effect of reducing the amount of generated soot by decreasing the injection amount of the main injection cannot be sufficiently achieved. Accordingly, the post-injection IJA is performed at least after the heat release from combustion of the air-fuel mixture formed by the main injection IJM is started.

Control of Injection Pressure

As described above, when the injection amount of the main injection IJM is decreased, and the post-injection IJA is added in the DC injection mode, the heat release rate is changed as illustrated by Z' in FIG. 7B. Accordingly, the maximum speed of increase in heat release rate and the peak value of the heat release rate are decreased by a larger amount than when fuel is injected in the DC injection mode (Y in FIG. 7B). Accordingly, when injection is performed in the form of injection as above at the time of switching the injection mode between the DC injection mode and the PCCI injection mode, the combustion noise level is decreased during transition in switching, and a driver is given a feeling of discordance.

In the present embodiment, the fuel injection pressure is increased in the DC-based switching mode by a larger amount than when fuel is injected in the DC injection mode. Specifically, the fuel injection pressure is increased such that the combustion noise level that is decreased by the decrease in the injection amount of the main injection is restored to that before the decrease.

More specifically, the maximum speed of increase in heat release rate or the peak value of the heat release rate at the time of steady operation based on the current engine load and engine rotational speed is calculated as a target maximum speed of increase or a target heat release rate. The current maximum speed of increase in heat release rate or the current peak value of the heat release rate is calculated based on the output of the cylinder internal pressure sensor 81 or the like. The difference between the current maximum speed of increase and the target maximum speed of increase in heat release rate calculated as above is calculated, or the difference between the current peak value and the target peak value of the heat release rate is calculated. The fuel injection pressure is controlled such that the difference in the maximum speed of increase or the difference in peak value calculated as above is decreased.

When such control is performed, as the amount of decrease in the injection amount of the main injection IJM in the DC-based switching mode is increased with respect to the injection amount of the main injection IJM in the DC injection mode, the injection amount of the post-injection IJA is increased, and the fuel injection pressure is increased. That is, in the switching mode of the present embodiment, as the injection amount of the post-injection is increased, the injection pressure at the time of performing the main injection is increased. Accordingly, even during transition in switching, the maximum speed of increase in heat release rate and the peak value of the heat release rate are maintained approximately the same further than when fuel is injected in the DC injection mode (Y in FIG. 7B). Consequently, making the driver feel discordance is reduced even during transition in switching.

Execution Region of Each Switching Mode

As described above, during transition in switching between the PCCI injection mode and the DC injection mode, fuel is injected in two injection modes of the PCCI-based switching mode and the DC-based switching mode. Hereinafter, fuel injection in any of the two switching modes of the PCCI-based switching mode and the DC-based switching mode during transition in switching will be described with reference to FIG. 9 and FIG. 10.

Figure 9:
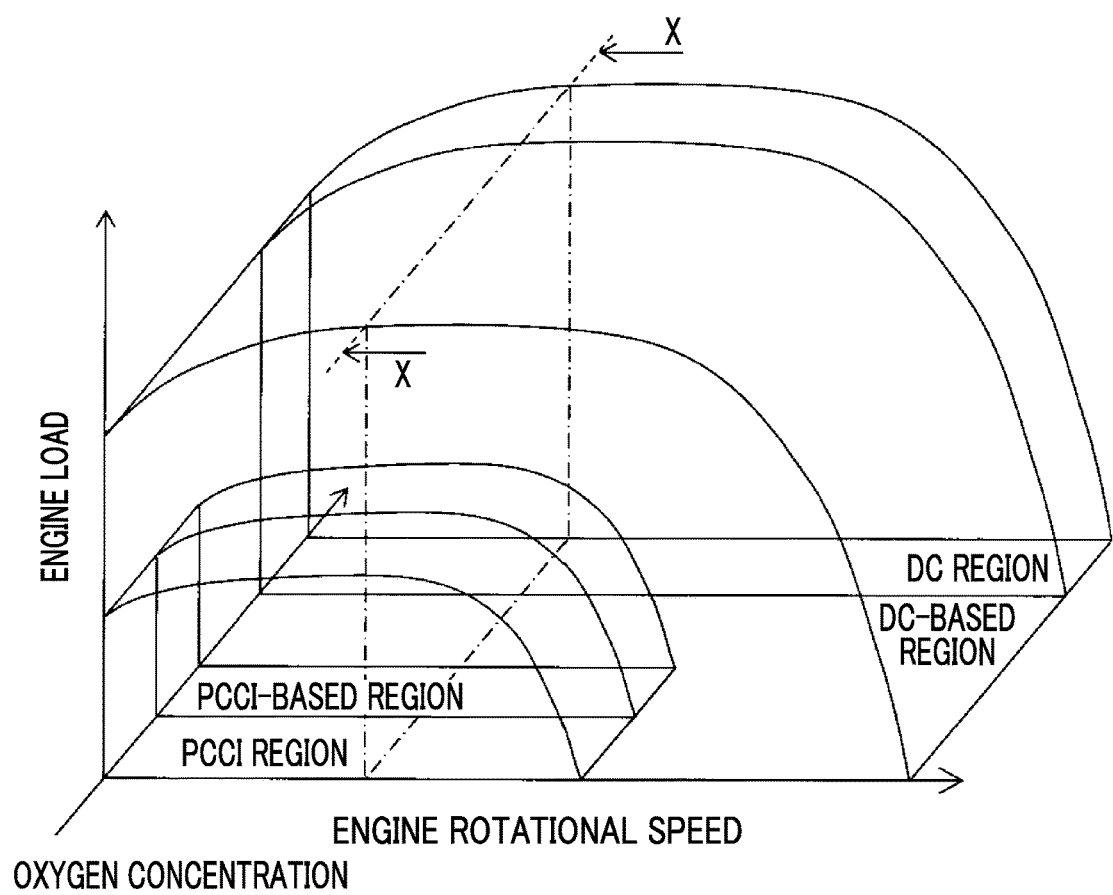
FIG. 9 is a diagram three-dimensionally illustrating a relationship among an engine rotational speed, the engine load, the oxygen concentration, and regions in which each injection mode and each switching mode are performed.
Figure 10:
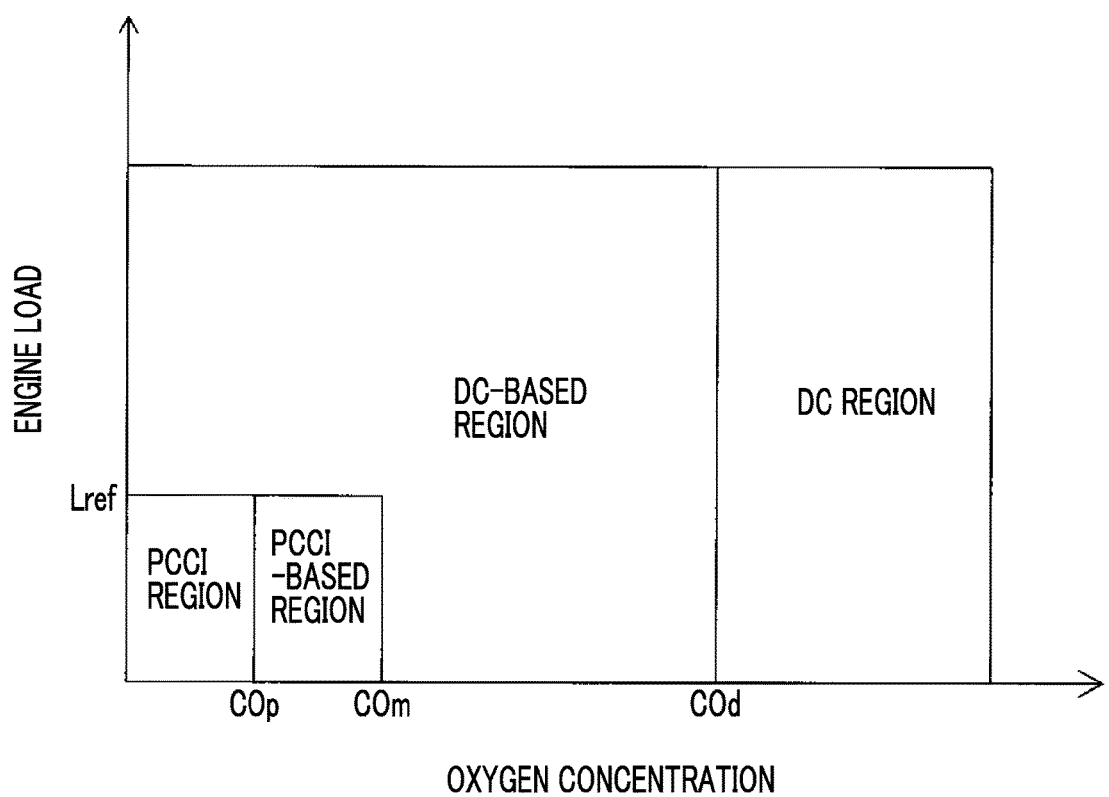
FIG. 10 is a diagram illustrating a relationship among the engine load, the oxygen concentration, and regions in which each injection mode and each switching mode are performed, and is a diagram illustrating a section taken along line X-X in FIG. 9.

FIG. 9 is a diagram three-dimensionally illustrating a relationship among the engine rotational speed, the engine load, the oxygen concentration, and regions in which each injection mode and each switching mode are performed. FIG. 10 is a diagram illustrating a relationship among the engine load, the oxygen concentration, and regions in which each injection mode and each switching mode are performed, and is a diagram illustrating a section taken along line X-X in FIG. 9.

As is understood from FIG. 9 and FIG. 10, the operating state that is determined by the engine rotational speed, the engine load, and the oxygen concentration is divided into four regions. Specifically, the operating state is divided into the PCCI region in which fuel is injected in the PCCI injection mode, the DC region in which fuel is injected in the DC injection mode, a PCCI-based region in which fuel is injected in the PCCI-based switching mode, and a DC-based region in which fuel is injected in the DC-based switching mode.

As is understood from FIG. 9 and FIG. 10, a region having a low engine rotational speed, a low engine load, and a low oxygen concentration is the PCCI region or the PCCI-based region. Particularly, the PCCI region is the region having a low oxygen concentration. Accordingly, when the engine rotational speed is low, and the engine load is low, and the oxygen concentration is low, fuel is injected in the PCCI injection mode or the PCCI-based switching mode.

A region having a high engine rotational speed, a high engine load, or a high oxygen concentration is the DC region or the DC-based region. Particularly, the DC region is the region having a high oxygen concentration. Accordingly, when the engine rotational speed is high, or the engine load is high, or the oxygen concentration is high, fuel is injected in the DC injection mode or the DC-based switching mode.

FIG. 10 illustrates a relationship among the engine load, the oxygen concentration, and each injection region when the engine rotational speed becomes equal to a specific engine rotational speed. As is understood from FIG. 10, in a case where the engine load is higher than or equal to the predetermined reference load Lref, fuel is injected in the DC injection mode when the oxygen concentration is higher than or equal to a first reference value COd. Fuel is injected in the DC-based switching mode when the oxygen concentration is lower than the first reference value COd.

As is understood from FIG. 10, when the engine load is higher than or equal to the reference load Lref, fuel is injected in the DC-based switching mode or the DC injection mode, and fuel is not injected in the PCCI injection mode or the PCCI-based switching mode. The reason is because when fuel is injected in the PCCI injection mode or the PCCI-based switching mode in a region in which the engine load is higher than or equal to the reference load Lref, the combustion noise level is increased. That is, since the fuel injection amount is increased in a region having a high engine load, when an air-fuel premixture including such a large amount of fuel self-ignites by compression and combusts instantaneously, the heat release rate is rapidly increased, and the peak value of the heat release rate is increased. Thus, the combustion noise level is increased.

Accordingly, an increase in combustion noise level can be reduced by not injecting fuel in the PCCI injection mode or the PCCI-based switching mode in a region in which the engine load is higher than or equal to the reference load Lref as illustrated in FIG. 10. In other words, the reference load Lref is set to a value greater than zero and less than the full load. The value is such that the combustion noise level is increased above a predetermined boundary value when fuel is injected in the PCCI injection mode or the PCCI-based switching mode in the state of an engine load higher than or equal to the value.

As described above, in a region in which the engine load is higher than or equal to the reference load Lref, fuel is injected in the DC injection mode when the oxygen concentration is higher than or equal to the first reference value COd. Fuel is injected in the DC-based switching mode when the oxygen concentration is lower than the first reference value COd. The reason is because when fuel is injected in the DC injection mode in the state of a low oxygen concentration, the amount of discharge of soot is increased as described with reference to FIG. 5B. Thus, the amount of discharge of soot is reduced by injecting fuel in the DC-based switching mode when the oxygen concentration is lower than the first reference value COd. Accordingly, the first reference value COd is set to a value that is lower than the target oxygen concentration at the time of the engine load being higher than or equal to the reference load Lref. The value is such that the amount of discharge of soot exceeds the upper limit value Slim when fuel is injected in the DC injection mode in the state of an oxygen concentration lower than or equal to the value.

When the engine load is lower than the reference load Lref, fuel is injected in the DC injection mode when the oxygen concentration is higher than or equal to the first reference value COd. When the oxygen concentration is lower than the first reference value COd and higher than or equal to a second reference value COm, fuel is injected in the DC-based switching mode. The second reference value COm is a value lower than the first reference value COd (a value of a lower oxygen concentration). When the oxygen concentration is lower than the second reference value COm and higher than or equal to a third reference value COp, fuel is injected in the PCCI-based switching mode. The third reference value COp is a value lower than the second reference value COm (a value of a lower oxygen concentration). When the oxygen concentration is lower than the third reference value COp, fuel is injected in the PCCI injection mode.

In a case where the engine load is lower than the reference load Lref, when the oxygen concentration is low, the combustion noise level is not significantly increased even when fuel is injected in the PCCI injection mode or the PCCI-based switching mode. When fuel is injected in the PCCI injection mode or the PCCI-based switching mode, the amount of discharge of soot or the amount of discharge of NOx can be reduced. Thus, when the engine load is lower than the reference load Lref, fuel is injected in the PCCI injection mode or the PCCI-based switching mode when the oxygen concentration is low, specifically, lower than the second reference value COm. Accordingly, the second reference value COm is set to a value such that even when fuel is injected in the PCCI injection mode or the PCCI-based switching mode, the combustion noise level is maintained at or below an upper limit value Blim, provided that the oxygen concentration is lower than the second reference value COm.

In a region in which the oxygen concentration is lower than the second reference value COm, fuel is injected in the PCCI-based switching mode when the oxygen concentration is higher than or equal to the third reference value COp. Fuel is injected in the PCCI injection mode when the oxygen concentration is lower than the third reference value COp. The reason is because when fuel is injected in the PCCI injection mode, the oxygen concentration is increased, and the combustion noise level is increased as described with reference to FIG. 5A. Thus, an increase in combustion noise level is reduced by injecting fuel in the PCCI-based switching mode. Accordingly, the third reference value COp is set to a value that is higher than the target oxygen concentration at the time of the engine load being lower than the reference load Lref. The value is such that the combustion noise level exceeds the upper limit value Blim when fuel is injected in the PCCI injection mode in the state of an oxygen concentration higher than or equal to the value.

In a case where the engine load is lower than the reference load Lref, the same applies as in a case where the engine load is higher than or equal to the reference load Lref. Fuel is injected in the DC injection mode when the oxygen concentration is higher than or equal to the first reference value COd. Fuel is injected in the DC-based switching mode when the oxygen concentration is lower than the first reference value COd. Accordingly, the amount of discharge of soot can be reduced.

Specific Example of Control

Figure 11:
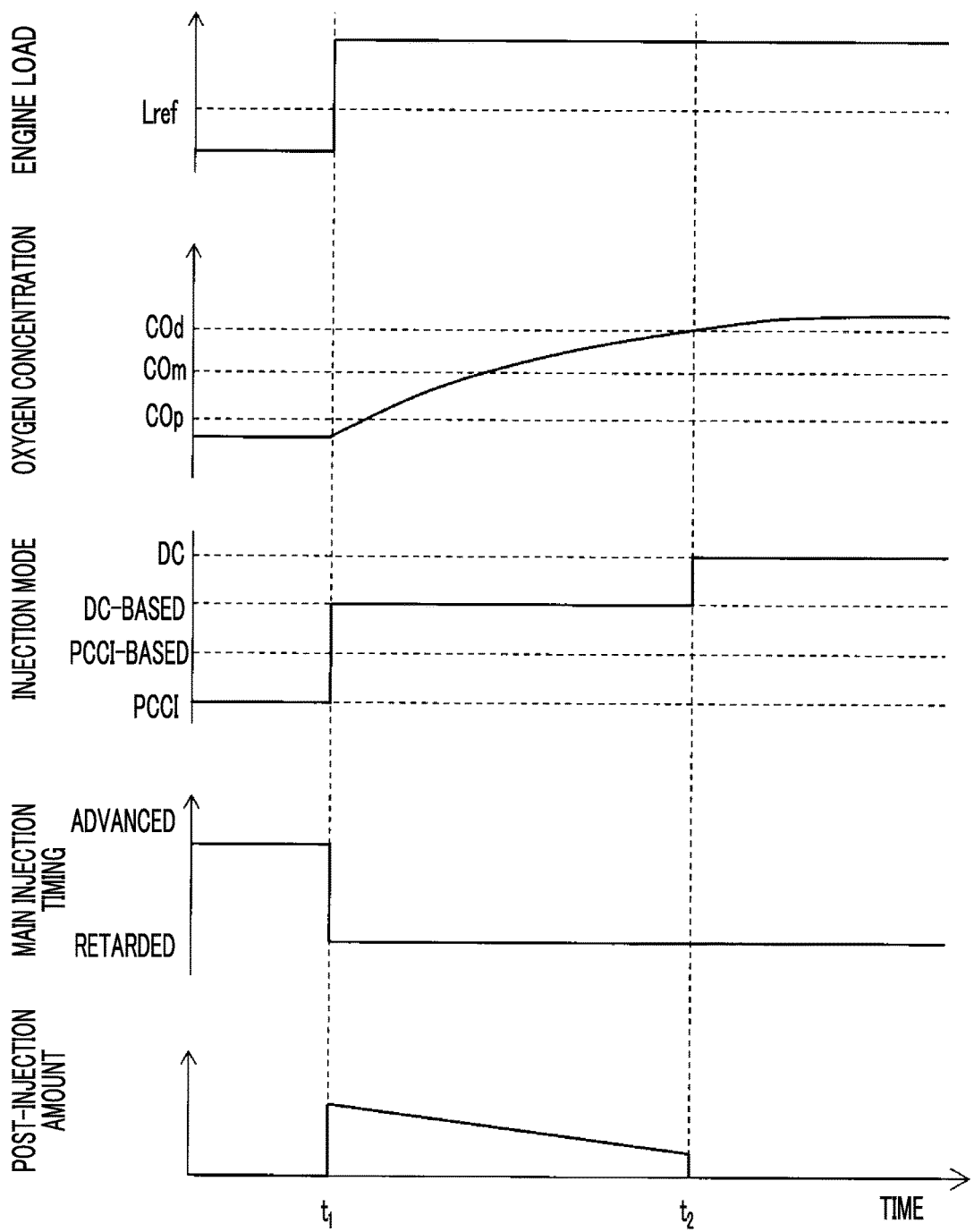
FIG. 11 is a timing chart of the engine load, the oxygen concentration, the injection mode, a main injection timing, and a post-injection amount when the engine load is increased stepwise.

Next, control of switching the injection mode at the time of a change in engine load will be described with reference to FIG. 11 and FIG. 12. FIG. 11 is a timing chart of the engine load, the oxygen concentration, the injection mode, a main injection timing, and a post-injection amount when the engine load is increased stepwise.

In the example illustrated in FIG. 11, the engine load is lower than the reference load Lref before time $t_1$, and fuel is injected in the PCCI injection mode. The oxygen concentration at such time is a low oxygen concentration corresponding to the PCCI injection mode.

At time $t_1$, the engine load is increased stepwise above the reference load Lref. When the engine load is increased at time $t_1$, the target oxygen concentration is consequently changed to a high oxygen concentration corresponding to the DC injection mode. Consequently, the EGR control valve 62 or the like is controlled such that the oxygen concentration is increased. However, as described above, since the speed of response of the oxygen concentration is comparatively slow, the oxygen concentration is gradually increased from time $t_1$.

When the engine load becomes higher than or equal to the reference load Lref at time $t_1$, the oxygen concentration at such a time point is low, and the operating state is set into a state within the DC-based region in FIG. 10. Accordingly, at time $t_1$, the injection mode is switched to the DC-based switching mode from the PCCI injection mode. Fuel is injected in the DC-based switching mode at time $t_1$. Thus, the injection timing of the main injection IJM is retarded, and the post-injection is started.

The oxygen concentration is gradually increased toward the target oxygen concentration after time $t_1$ as described above. When the oxygen concentration is increased, soot is unlikely to be generated. Thus, the injection amount of the main injection IJM can be increased, and the injection amount of the post-injection IJA is decreased consequently.

Accordingly, the injection amount of the post-injection IJA is gradually decreased after time $t_1$ due to a gradual increase in oxygen concentration.

Then, when the oxygen concentration reaches the first reference value COd at time $t_2$, the injection mode is switched to the DC injection mode from the DC-based switching mode. Accordingly, the post-injection IJA is finished at time $t_2$.

As is understood from FIG. 11, in the present embodiment, when the injection mode is switched to the DC injection mode from the PCCI injection mode, the switching is performed through the DC-based switching mode and not through the PCCI-based switching mode. In other words, in the present embodiment, when the engine load is higher than or equal to the reference load Lref, switching between the PCCI injection mode and the DC injection mode is performed through the DC-based switching mode and not through the PCCI-based switching mode.

Figure 12:
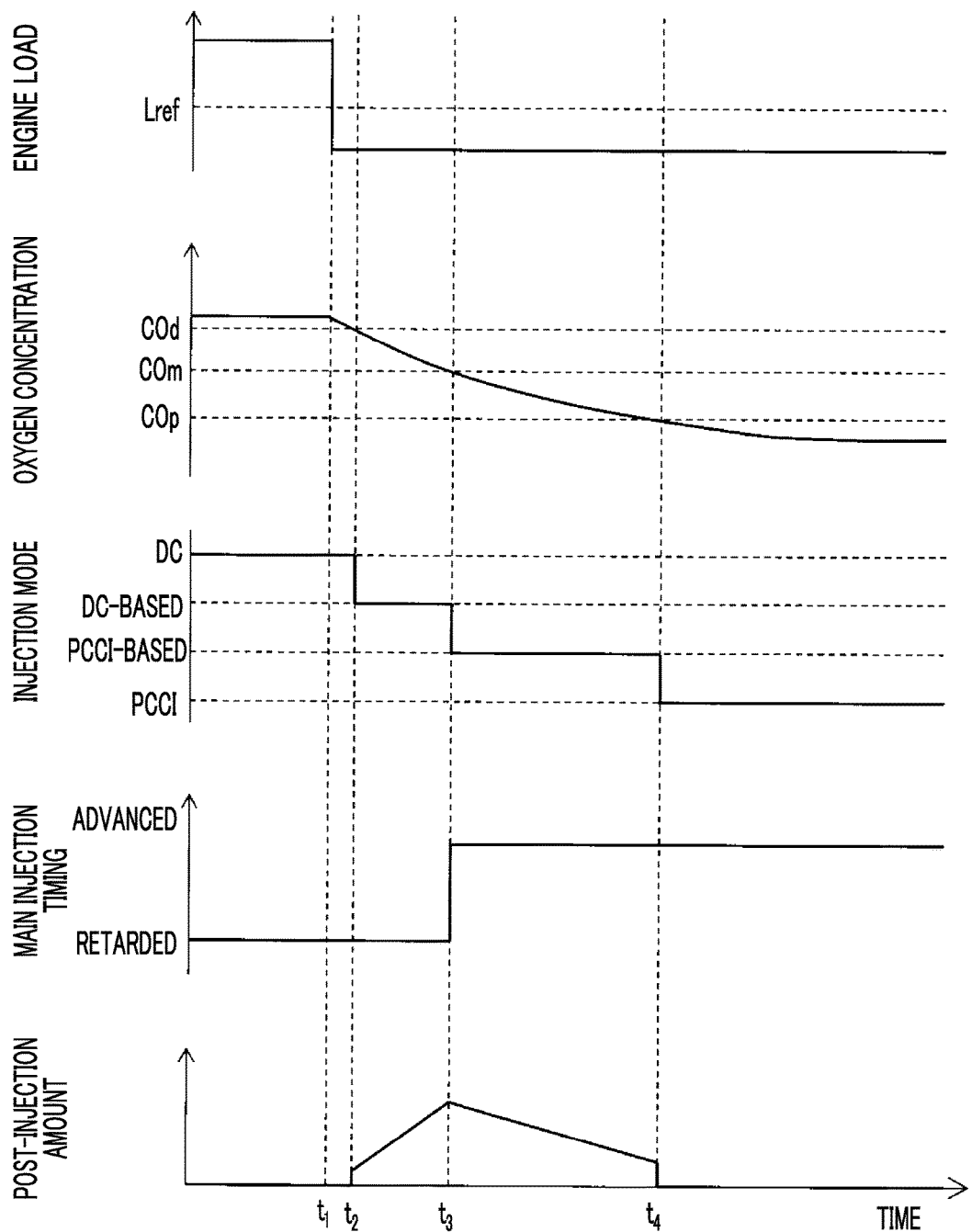
FIG. 12 is a timing chart of the engine load, the oxygen concentration, the injection mode, the main injection timing, and the post-injection amount when the engine load is decreased stepwise.

FIG. 12 is a timing chart of the engine load, the oxygen concentration, the injection mode, the main injection timing, and the post-injection amount when the engine load is decreased stepwise.

In the example illustrated in FIG. 12, the engine load is higher than or equal to the reference load Lref before time $t_1$, and fuel is injected in the DC injection mode. The oxygen concentration at such time is a high oxygen concentration corresponding to the DC injection mode.

At time $t_1$, the engine load is decreased stepwise below the reference load Lref. When the engine load is decreased at time $t_1$, the target oxygen concentration is consequently changed to a low oxygen concentration corresponding to the PCCI injection mode. Consequently, the EGR control valve 62 or the like is controlled such that the oxygen concentration is decreased. However, as described above, since the speed of response of the oxygen concentration is comparatively slow, the oxygen concentration is gradually decreased from time $t_1$.

When the engine load becomes lower than the reference load Lref at time $t_1$, the oxygen concentration at such a time point is high, and the operating state is set into a state within the DC region. Accordingly, at time $t_1$, the injection mode is not switched and is maintained in the DC injection mode.

Then, when the oxygen concentration is gradually decreased, and the oxygen concentration reaches the first reference value COd at time $t_2$, the injection mode is switched to the DC-based switching mode from the DC injection mode. Fuel is injected in the DC-based switching mode at time $t_2$. Thus, the post-injection is started. The injection amount of the post-injection IJA is gradually increased after time $t_2$ due to a gradual decrease in oxygen concentration.

The oxygen concentration is gradually decreased after time $t_2$. When the oxygen concentration reaches the second reference value COm at time $t_3$, the injection mode is switched to the PCCI-based switching mode from the DC-based switching mode. Fuel is injected in the PCCI-based switching mode at time $t_3$. Thus, the injection timing of the main injection IJm is advanced. The oxygen concentration is gradually decreased toward the target oxygen concentration after time $t_3$. When the oxygen concentration is decreased in the PCCI-based switching mode, the combustion noise level is gradually decreased. Thus, the injection amount of the main injection IJM can be increased, and the injection amount of the post-injection IJA is decreased consequently. Accordingly, the injection amount of the post-injection IJA is gradually decreased after time $t_3$ due to a gradual decrease in oxygen concentration.

Then, when the oxygen concentration is decreased, and the oxygen concentration reaches the third reference value COp at time $t_4$, the injection mode is switched to the PCCI injection mode from the PCCI-based switching mode. Accordingly, the post-injection IJA is finished at time $t_4$.

As is understood from FIG. 12, in the present embodiment, when the injection mode is switched to the PCCI injection mode from the DC injection mode, the switching is performed through both of the PCCI-based switching mode and the DC-based switching mode. Particularly, in the present embodiment, when the injection mode is switched to the PCCI injection mode from the DC injection mode, the switching is performed by performing the switching mode in the order of the DC-based switching mode and the PCCI-based switching mode. In other words, in the present embodiment, when the engine load is lower than the reference load Lref, switching between the PCCI injection mode and the DC injection mode is performed through both of the PCCI-based switching mode and the DC-based switching mode.

Flowchart

Figure 13:
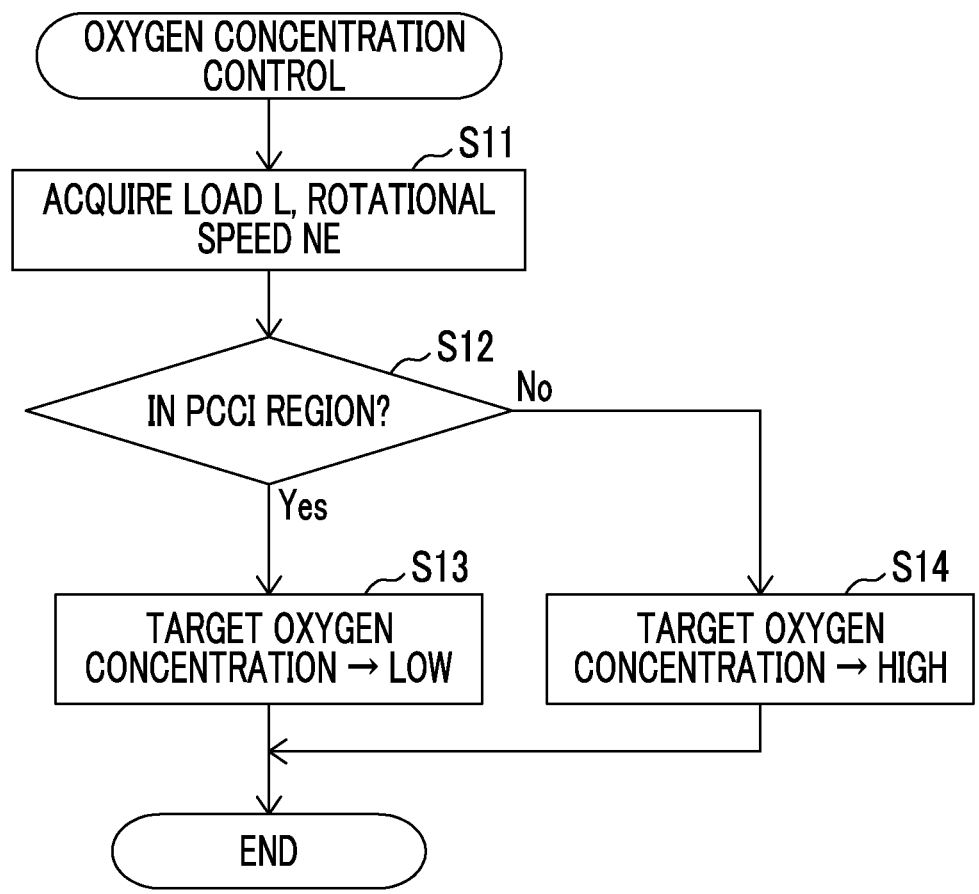
FIG. 13 is a flowchart illustrating a control routine of oxygen concentration control.

Hereinafter, oxygen concentration control and injection control will be described with reference to FIG. 13 to FIG. 16. FIG. 13 is a flowchart illustrating a control routine of the oxygen concentration control. The illustrated control routine is executed at constant time intervals (for example, 4 ms).

With reference to FIG. 13, first, in step S11, an engine load L is acquired based on the output of the load sensor 89, and an engine rotational speed NE is acquired based on the output of the crank angle sensor 90. In step S12, a determination as to whether or not the engine operating state determined from the current engine load L and engine rotational speed NE acquired in step S11 is within the PCCI region illustrated in FIG. 4 is performed.

When the current engine operating state is determined to be within the PCCI region in step S12, a transition is made to step S13. In step S13, the target oxygen concentration is set to a lower value (lower than the third reference value COp), and the control routine is finished. When the current engine operating state is determined not to be within the PCCI region in step S12, that is, when the current engine operating state is determined to be within the DC region, a transition is made to step S14. In step S14, the target oxygen concentration is set to a higher value (higher than or equal to the first reference value COd), and the control routine is finished.

An actuator for changing the oxygen concentration, for example, the EGR control valve 62, is controlled such that the oxygen concentration in the intake gas supplied into the combustion chamber 15 becomes equal to the target oxygen concentration set in steps S13, S14. Accordingly, for example, when the target oxygen concentration is set to a lower value by step S13, the opening degree of the EGR control valve 62 is increased such that the EGR rate is increased. Conversely, when the target oxygen concentration is set to a higher value by step S14, the opening degree of the EGR control valve 62 is decreased such that the EGR rate is decreased.

Figure 14:
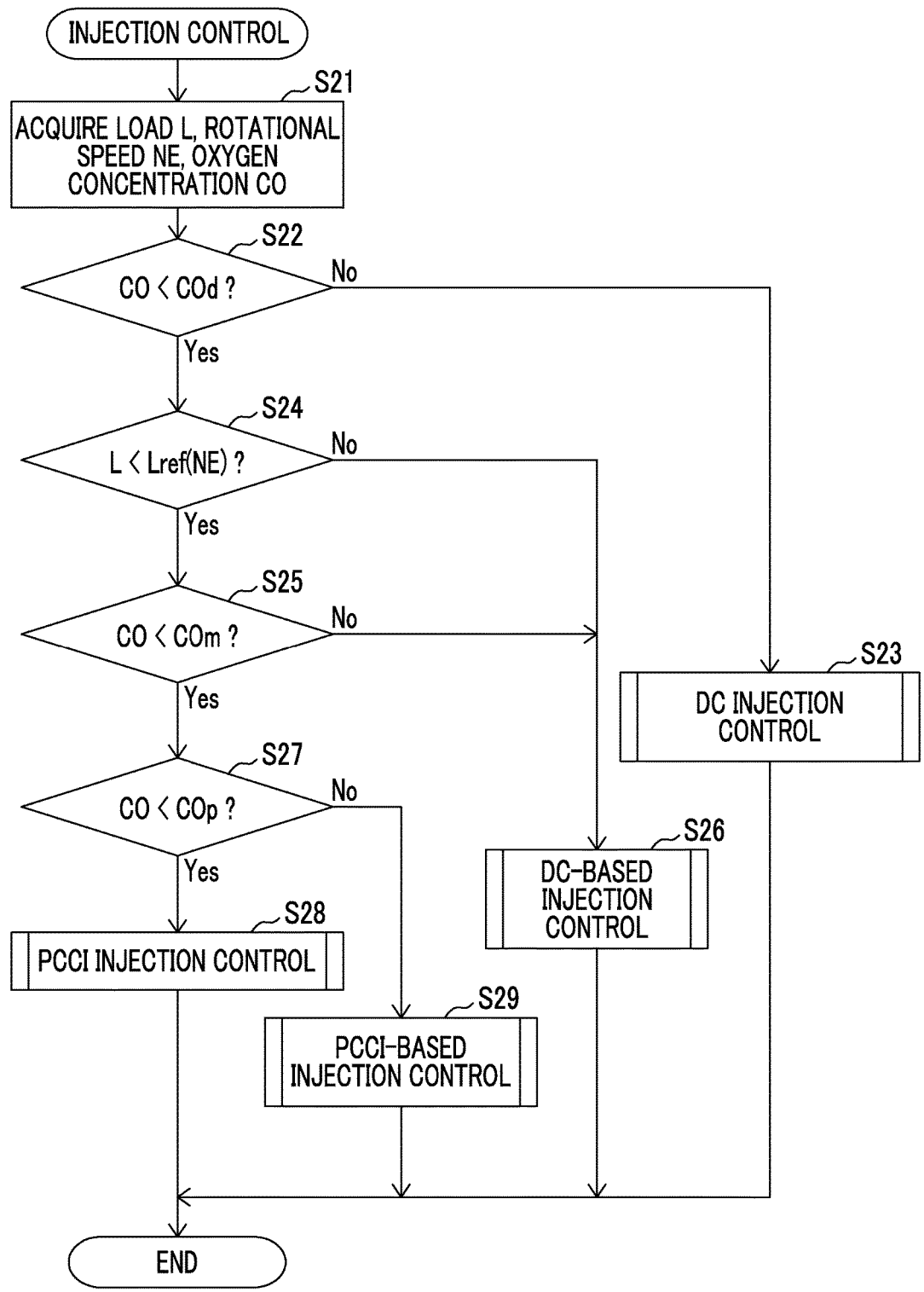
FIG. 14 is a flowchart illustrating a control routine of fuel injection control of a fuel injection valve.

FIG. 14 is a flowchart illustrating a control routine of fuel injection control of the fuel injection valve 31. The illustrated control routine is executed at constant time intervals (for example, 4 ms).

With reference to FIG. 14, first, in step S21, the engine load L and the engine rotational speed NE are acquired in the same manner as step S11. An oxygen concentration CO in the intake gas is calculated based on the opening degree of the EGR control valve 62, the flow rate of air detected by the air flow meter 84, the temperature of the intake gas detected by the temperature sensor 87, and the pressure of the intake gas detected by the pressure sensor 86.

In step S22, a determination as to whether or not the current oxygen concentration CO calculated in step S21 is lower than the first reference value COd is performed. When the current oxygen concentration CO is determined to be higher than or equal to the first reference value COd in step S22, a transition is made to step S23. In step S23, DC injection control for injecting fuel in the DC injection mode is performed, and the control routine is finished.

When the current oxygen concentration CO is determined to be lower than the first reference value COd in step S22, a transition is made to step S24. In step S24, a determination as to whether or not the engine load L acquired in step S21 is lower than the reference load Lref is performed. As is understood from FIG. 9, the reference load Lref is changed in accordance with the engine rotational speed NE. Thus, in the present embodiment, the reference load Lref is set based on the engine rotational speed NE. Specifically, the reference load Lref is basically set to be decreased as the engine rotational speed NE is increased.

When the engine load L is determined to be higher than or equal to the reference load Lref in step S24, a transition is made to step S26. When the engine load L is determined to be lower than the reference load Lref in step S24, a transition is made to step S25. In step S25, a determination as to whether or not the current oxygen concentration CO is lower than the second reference value COm is performed. When the current oxygen concentration CO is determined to be higher than or equal to the second reference value COm in step S25, a transition is made to step S26. In step S26, DC-based injection control for injecting fuel in the DC-based switching mode is performed, and the control routine is finished. The DC-based injection control will be described with reference to FIG. 16.

When the current oxygen concentration CO is determined to be lower than the second reference value COm in step S25, a transition is made to step S27. In step S27, a determination as to whether or not the current oxygen concentration CO is lower than the third reference value COp is performed. When the current oxygen concentration CO is determined to be higher than or equal to the third reference value COp in step S27, a transition is made to step S29. In step S29, PCCI-based injection control for injecting fuel in the PCCI-based switching mode is performed, and the control routine is finished. The PCCI-based injection control will be described with reference to FIG. 15. When the current oxygen concentration CO is determined to be lower than the third reference value COp in step S27, a transition is made to step S28. In step S28, PCCI injection control for injecting fuel in the PCCI injection mode is performed, and the control routine is finished.

Figure 15:
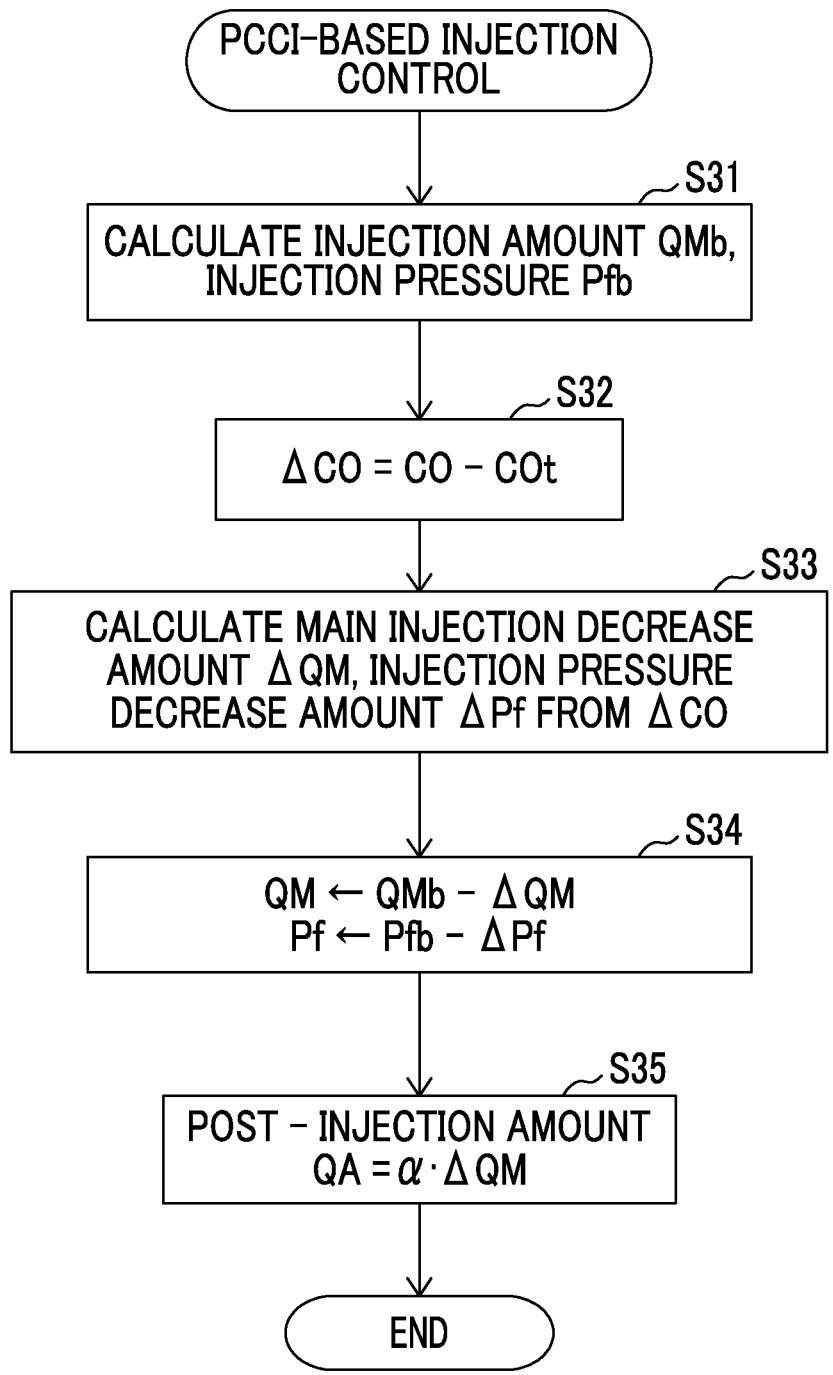
FIG. 15 is a flowchart illustrating a control routine of PCCI-based injection control for injecting fuel in the PCCI-based switching mode.

FIG. 15 is a flowchart illustrating a control routine of the PCCI-based injection control for injecting fuel in the PCCI-based switching mode. The illustrated control routine is executed each time the control routine illustrated in FIG. 14 reaches step S29.

First, in step S31, a base injection amount QMb and a base injection pressure Pfb are calculated based on the current engine operating state. The base injection amount QMb and the base injection pressure Pfb are the injection amount and the injection pressure in the main injection IJM when fuel is assumed to be injected in the PCCI injection mode.

In step S32, a concentration difference $\Delta CO$ between the current oxygen concentration CO calculated in step S21 in FIG. 14 and a target oxygen concentration COt at the time of injecting fuel in the PCCI injection mode is calculated. As the concentration difference ΔCO is increased, the maximum speed of increase and the peak value of the heat release rate achieved by combustion of fuel injected by the main injection IJM are increased, and the combustion noise level is increased.

In step S33, a decrease amount ΔQM and an injection pressure decrease amount ΔPf of the main injection IJM are calculated based on the concentration difference ΔCO calculated in step S32. The decrease amount ΔQM of the main injection IJM is increased to the predetermined boundary amount as the concentration difference ΔCO is increased. When the concentration difference ΔCO is increased further, the decrease amount ΔQM of the main injection IJM is maintained at the boundary amount. When the concentration difference is increased to or above a concentration difference ΔCOlim with which the decrease amount ΔQM of the main injection IJM reaches the boundary amount, the concentration difference ΔCO is increased, and the injection pressure decrease amount ΔPf is decreased.

In step S34, a target injection amount QM of the main injection IJM is calculated by subtracting the decrease amount ΔQM of the main injection IJM calculated in step S33 from the base injection amount QMb of the main injection IJM calculated in step S31 (QM=QMb−ΔQM). In addition, in step S34, a target injection pressure Pf is calculated by subtracting the injection pressure decrease amount ΔPf calculated in step S33 from the base injection pressure Pfb calculated in step S31 (Pf=Pfb−ΔPf).

In step S35, a value acquired by multiplying the decrease amount ΔQM of the main injection IJM calculated in step S33 by α is calculated as a target injection amount QA in the post-injection IJA (QA=α·ΔQM), and the control routine is finished. Here, a is a constant greater than one.

The fuel injection valve 31 performs the main injection IJM having the target injection amount QM calculated in step S34, and performs the post-injection IJA having the target injection amount QA calculated in step S35. The fuel pump 34 or the like is controlled such that the injection pressure becomes equal to the target injection pressure Pf calculated in step S34.

Figure 16:
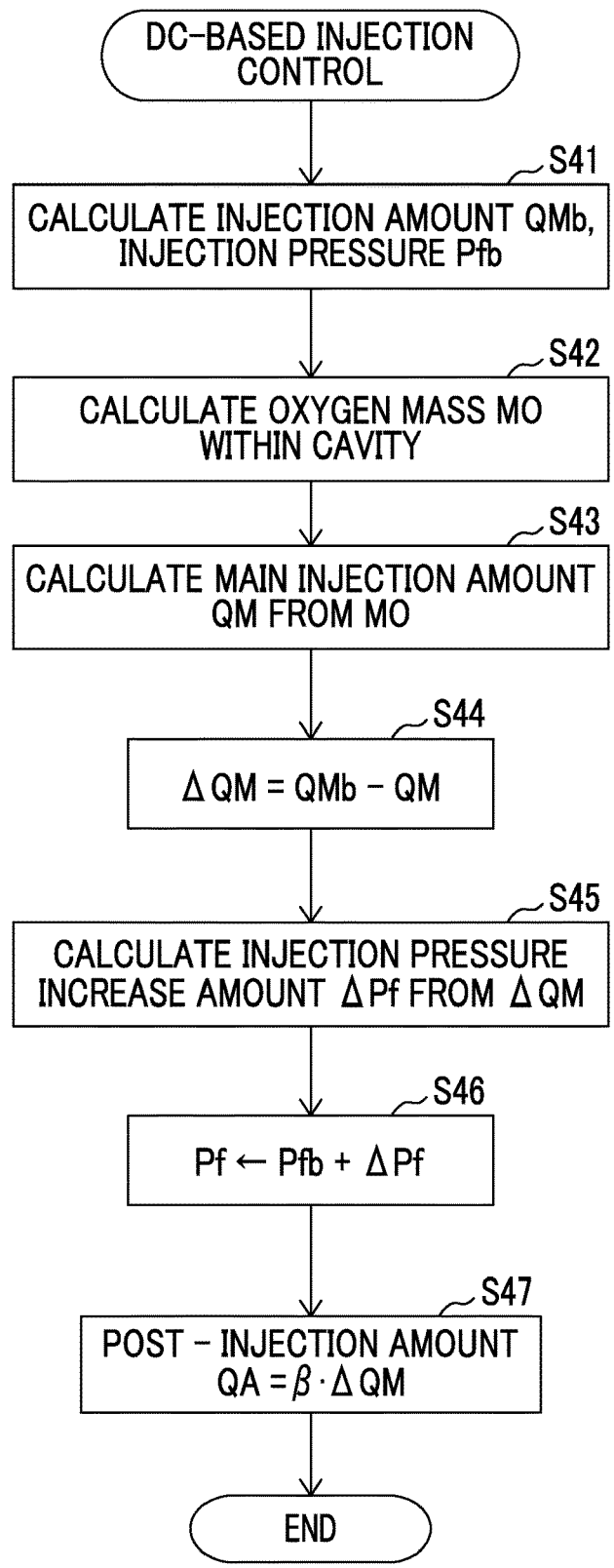
FIG. 16 is a flowchart illustrating a control routine of DC-based injection control for injecting fuel in the DC-based switching mode.

FIG. 16 is a flowchart illustrating a control routine of the DC-based injection control for injecting fuel in the DC-based switching mode. The illustrated control routine is executed each time the control routine illustrated in FIG. 14 reaches step S26.

First, in step S41, the base injection amount QMb and the base injection pressure Pfb are calculated based on the current engine operating state in the same manner as step S31. The base injection amount QMb and the base injection pressure Pfb are the injection amount and the injection pressure in the main injection IJM when fuel is assumed to be injected in the DC injection mode.

In step S42, an oxygen mass MO within the cavity 16 at the end of the main injection IJM is calculated. The oxygen mass MO within the cavity 16 is calculated based on the oxygen concentration CO calculated in step S21 and the expected end timing of the main injection IJM. Specifically, the oxygen mass MO is calculated as follows.

When the expected end timing of the main injection IJM is early, the piston 14 is positioned in the vicinity of the top dead center. Thus, the capacity of the combustion chamber 15 outside the cavity 16 is small, and the oxygen mass ratio within the cavity 16 is high. When the expected end timing of the main injection IJM is late, the piston 14 is positioned away from the top dead center. Thus, the capacity of the combustion chamber 15 outside the cavity 16 is large, and the oxygen mass ratio within the cavity 16 is low. The oxygen mass ratio within the cavity 16 is calculated as above based on the expected end timing of the main injection IJM, and the mass of oxygen supplied into the entirety of the combustion chamber 15 is calculated from the oxygen concentration CO calculated in step S21. The oxygen mass MO within the cavity 16 is calculated by multiplying the mass of oxygen within the entirety of the combustion chamber 15 by the oxygen mass ratio within the cavity 16 calculated as above.

In step S43, the target injection amount QM of the main injection is calculated based on the oxygen mass MO within the cavity 16 calculated in step S42 and the boundary value of the oxygen/fuel ratio. Specifically, the target injection amount QM of the main injection is calculated by dividing the oxygen mass MO within the cavity 16 by the boundary value.

In step S44, a value acquired by subtracting the target injection amount QM of the main injection calculated in step S43 from the base injection amount QMb calculated in step S41 is calculated as the decrease amount ΔQM of the main injection IJM. The decrease amount ΔQM of the main injection IJM indicates the amount by which the target injection amount is insufficient with respect to the injection amount of the main injection corresponding to the engine load.

In step S45, the injection pressure increase amount ΔPf is calculated by using a map that is acquired in advance, based on the decrease amount ΔQM of the main injection IJM calculated in step S44. The injection pressure increase amount ΔPf is calculated as being increased as the decrease amount ΔQM of the main injection IJM is increased. In step S46, the target injection pressure Pf is calculated by adding the injection pressure decrease amount ΔPf calculated in step S45 to the base injection pressure Pfb calculated in step S41 (Pf=Pfb+ΔPf).

In step S47, a value acquired by multiplying the decrease amount ΔQM of the main injection IJM calculated in step S44 by β is calculated as the target injection amount QA in the post-injection IJA (QA=β·ΔQM), and the control routine is finished. Here, β is a constant greater than one.

What is claimed is:

1. A control device for an internal combustion engine including a fuel injection valve that directly injects fuel into a combustion chamber, and an actuator configured to change an oxygen concentration in intake gas supplied to the combustion chamber of the internal combustion engine, the control device comprising an electronic control unit configured to control fuel injection from the fuel injection valve and the actuator such that
   i) a first injection mode and a second injection mode are executed, the first injection mode being a mode in which main injection is performed after pre-injection is performed, and in which fuel injection from the fuel injection valve is controlled such that heat release from an air-fuel mixture formed by the pre-injection is started after the start of the main injection, and the second injection mode being a mode in which main injection is performed after pre-injection is performed, and in which fuel injection from the fuel injection valve is controlled such that heat release from an air-fuel mixture formed by the pre-injection is started before the start of the main injection,
   ii) when fuel injection from the fuel injection valve is controlled in the first injection mode, the actuator is controlled such that the oxygen concentration is decreased by a larger amount than when fuel injection from the fuel injection valve is controlled in the second injection mode, iii) a first switching mode and a second switching mode are executed, the first switching mode being a mode in which pre-injection, main injection, and post-injection are performed in order, and in which fuel injection from the fuel injection valve is controlled such that heat release from an air-fuel mixture formed by the pre-injection is started after the start of the main injection, and that the post-injection is performed after heat release from an air-fuel mixture formed by the main injection is started, and the second switching mode being a mode in which pre-injection, main injection, and post-injection are performed in order, and in which fuel injection from the fuel injection valve is controlled such that heat release from an air-fuel mixture formed by the pre-injection is started before the start of the main injection, and that the post-injection is performed after heat release from an air-fuel mixture formed by the main injection is started, iv) when an engine load is lower than a predetermined load, switching is performed through the first switching mode and the second switching mode, and v) when the engine load is higher than or equal to the predetermined load, switching is performed through the second switching mode and not through the first switching mode.

2. The control device according to claim 1, wherein the electronic control unit is configured to perform switching through the second switching mode and not through the first switching mode when an injection mode is switched to the second injection mode from the first injection mode, and perform switching through the first switching mode and the second switching mode when the injection mode is switched to the first injection mode from the second injection mode.

3. The control device according to claim 2, wherein the electronic control unit is configured to perform the switching by performing a switching mode in an order of the second switching mode and the first switching mode, when the second injection mode is switched to the first injection mode.

4. The control device according to claim 1, wherein when fuel is injected in the first switching mode, the electronic control unit is configured to decrease a fuel injection amount of the main injection further than the fuel injection amount of the main injection in the first injection mode such that a combustion noise level becomes lower than or equal to a target combustion noise level, and when the amount of decrease becomes greater than or equal to a predetermined amount, maintain the amount of decrease at the predetermined amount and decrease an injection pressure of the main injection further than the injection pressure of the main injection in the first injection mode.

5. The control device according to claim 1, wherein the electronic control unit is configured to switch an injection mode to the first injection mode when the engine load becomes lower than the predetermined load, and switch the injection mode to the second injection mode when the engine load becomes higher than or equal to the predetermined load, and the predetermined load is changed in accordance with an engine rotational speed.

* * * * *